United States Patent
Sabe et al.

(10) Patent No.: US 7,388,879 B2
(45) Date of Patent: Jun. 17, 2008

(54) COMMUNICATION DEVICE AND COMMUNICATION METHOD NETWORK SYSTEM AND ROBOT APPARATUS

(75) Inventors: Kohtaro Sabe, Tokyo (JP); Kenta Kawamoto, Tokyo (JP); Gabriel Costa, Tokyo (JP)

(73) Assignee: Sony Corporation, Tokyo (JP)

( * ) Notice: Subject to any disclaimer, the term of this patent is extended or adjusted under 35 U.S.C. 154(b) by 1037 days.

(21) Appl. No.: 10/111,564

(22) PCT Filed: Aug. 28, 2001

(86) PCT No.: PCT/JP01/07394

§ 371 (c)(1),
(2), (4) Date: Sep. 24, 2002

(87) PCT Pub. No.: WO02/19104

PCT Pub. Date: Mar. 7, 2002

(65) Prior Publication Data

US 2003/0095514 A1 May 22, 2003

(30) Foreign Application Priority Data

Aug. 28, 2000 (JP) .............................. 2000-258039

(51) Int. Cl.
*H04L 12/28* (2006.01)
*H04Q 7/00* (2006.01)
*G06F 15/16* (2006.01)

(52) U.S. Cl. .................. 370/466; 370/328; 370/401; 709/203; 700/245

(58) Field of Classification Search ......... 370/295–328, 370/389–428, 468–493; 709/201–227; 700/245–258
See application file for complete search history.

(56) References Cited

U.S. PATENT DOCUMENTS 5,504,669 A * 4/1996 Wakabayashi et al. ......... 700/2

(Continued)

FOREIGN PATENT DOCUMENTS

| EP | 0 877 320 | 11/1998 |
| EP | 0 924 034 | 6/1999 |
| EP | 0 940 748 | 9/1999 |
| JP | 4-74345 | 6/1992 |
| JP | 10-240504 | 9/1998 |
| JP | 10-320322 | 12/1998 |
| JP | 10-320367 | 12/1998 |
| JP | 11-312088 | 11/1999 |
| JP | 2000-210886 | 8/2000 |

OTHER PUBLICATIONS

Kanehiro F et al: "Development of a remote-brained humanoid for research on whole body action" Robotics and Automation, 1998.

(Continued)

*Primary Examiner*—Man U. Phan
(74) *Attorney, Agent, or Firm*—Frommer Lawrence & Haug LLP; William S. Frommer; Thomas F. Presson

(57) ABSTRACT

A gateway object (48) for transmitting and receiving data to and from an object of a robot apparatus (1) is allocated to a radio LAN PC card (41) of the robot apparatus (1), and a gateway object (52) for transmitting and receiving data to and from an object on a personal computer (32) is allocated to a network adapter (31) of a remote system (30). When the radio LAN PC card (41) and the network adapter (31) are connected with each other by radio or wired connection, inter-object communication is carried out between the gateway object (48) of the radio LAN PC card (41) and the gateway object (52) of the network adapter (31), thereby carrying out inter-object communication between the object of the robot apparatus (1) and the object of the personal computer (32). Thus, preparation of a program is facilitated.

32 Claims, 26 Drawing Sheets

U.S. PATENT DOCUMENTS

| | | | |
|---|---|---|---|
| 6,127,941 A * | 10/2000 | Van Ryzin | 340/825.69 |
| 6,175,206 B1 * | 1/2001 | Ueno et al. | 318/568.1 |
| 6,265,974 B1 * | 7/2001 | D'Angelo et al. | 340/568.1 |
| 6,304,894 B1 * | 10/2001 | Nakayama et al. | 709/203 |
| 6,314,326 B1 * | 11/2001 | Fuchu | 700/17 |
| 6,381,515 B1 * | 4/2002 | Inoue et al. | 700/245 |
| 6,505,097 B1 * | 1/2003 | Fujita et al. | 700/245 |
| 6,560,511 B1 * | 5/2003 | Yokoo et al. | 700/245 |
| 6,625,170 B1 * | 9/2003 | Curry et al. | 370/467 |
| 6,889,117 B2 * | 5/2005 | Sabe et al. | 700/245 |
| 6,975,635 B2 * | 12/2005 | Takeyama et al. | 370/401 |
| 7,085,805 B1 * | 8/2006 | Ruberg et al. | 709/203 |
| 7,089,083 B2 * | 8/2006 | Yokoo et al. | 700/245 |
| 7,140,025 B1 * | 11/2006 | Dillow et al. | 719/313 |

OTHER PUBLICATIONS

Proceedings. 1998 IEEE International Conference on Leuven, Belgium May 16-20, 1998, New York, NY, USA,IEEE, US, vol. 2, May 16, 1998, pp. 1302-1307, XP010281258 ISBN: 0-7803-4300-X.

Kagami S et al: "Design and implementation of brain real-time part for remote-brained robot approach" Intelligent Robots and Systems, 1997. IROS '97., Proceedings of the 1997 IEEE/RSJ International Conference on Grenoble, France Sep. 7-11, 1997, New York, NY, USA,IEEE, US, vol. 2, Sep. 7, 1997, pp. 828-835, XP010264741 ISBN: 0-7803-4119-8.

Fujita M et al: "A reconfigurable robot platform" Robotics and Autonomous Systems, Elsevier Science Publishers, Amsterdam, NL, vol. 29, No. 2-3, Nov. 30, 1999, pp. 119-132, XP004218279 ISSN: 0921-8890.

Fujita M et al: "Syntactic-semantic analysis of reconfigurable robot" Intelligent Robots and Systems, 1999. IROS '99. Proceedings. 1999 IEEE/RSJ International Conference on Kyongju, South Korea Oct. 17-21, 1999, Piscataway, NJ, USA,IEEE, US, vol. 3, Oct. 17, 1999, pp. 1567-1572, XP010362404 ISBN: 0-7803-5184-3.

"Universal Protocol Conversion" IBM Technical Disclosure Bulletin, IBM Corp. New York, US, vol. 38, No. 12, Dec. 1, 1995, pp. 323-324, XP000588157 ISSN: 0018-8689.

Perret J et al: "How to Tele-Program a Remote Intelligent Robot" Proceedings of the IEEE/RSJ/GI International Conference on Intelligent Robots and Systems: Advanced Robotic Systems and the Real World. Munich, Sep. 12-16, 1994, Proceedings of the International Conference on Intelligent Robots and Systems (IROS), vol. 1, Sep. 12, 1994, pp. 397-404, XP000512703.

Gamme E et al: "Design Patterns: Elements of Reusable Object-Oriented Software, Passage" Design Patterns. Elements of Reusable Object-Oriented Software, XX, XX, 1995, pp. 273-282,293, XP002367378.

"The Layered Approach: The OSI Model" Data and Computer Communications, 1991, pp. 446-456, XP000917810.

* cited by examiner

| STATE INPUT | Sleep | Rest | Wakeup | Move |
|---|---|---|---|---|
| NOTHING IS DETECTED FOR ONE MINUTE | Sleep | Sleep | Rest | Wakeup |
| RED, SIZE<10 CONTINUED FOR 10 SECONDS OR MORE | Rest | Wakeup | Move | Move |
| RED, SIZE>=10 | Wakeup | Move | Move | Move |

```
DRX-4Legged {
    DRX Head ;
    DRX RightFrontLeg ;
    DRX LeftFrontLeg ;
    DRX RightRearLeg ;
    DRX LeftRearLeg ;
}
DRX Wheel {
    DRX Head ;
    DRX RightFrontLeg ;
    DRX LeftFrontLeg ;
    DRX RightRearWheel ;
    DRX LeftRearWheel ;
}
DRX Head {
    DRX CameraLink ;
}
Virtual CameraLink {
    DRX CameraLink ;
    Camera ;
    Coordinate : /
}
DRX RightFrontLeg {
    Coordinate : /C1/C0-Joint ;
    Coordinate : /C1/C0/C0-Joint ;
    Coordinate : /C1/C0/C0/C0-Joint ;
    Coordinate : /C1/C0/C0/C0/C0-TouchSensor :
}
DRX LeftFrontLeg {
    Coordinate : /C2/C0-Joint ;
    Coordinate : /C2/C0/C0-Joint ;
    Coordinate : /C2/C0/C0/C0-Joint ;
    Coordinate : /C2/C0/C0/C0/C0-TouchSensor :
}
DRX RightRearLeg {
    Coordinate : /C3/C0-Joint ;
    Coordinate : /C3/C0/C0-Joint ;
    Coordinate : /C3/C0/C0/C0-Joint ;
    Coordinate : /C3/C0/C0/C0/C0-TouchSensor :
}
DRX LeftRearLeg {
    Coordinate : /C4/C0-Joint ;
    Coordinate : /C4/C0/C0-Joint ;
    Coordinate : /C4/C0/C0/C0-Joint ;
    Coordinate : /C4/C0/C0/C0/C0-TouchSensor :
}
DRX RightRearWheel {
    Coordinate : /C3/C0-Wheel ;
}
DRX LeftRearWheel {
    Coordinate : /C4/C0-Wheel ;
}
```

FIG.8

```
CPC Current Information {
    Coordinate : /C0/C0-Joint ;
    Coordinate : /C0/C0/C0-Joint ;
    Coordinate : /C0/C0/C0/C0-Joint ;
    Coordinate : /C0/C0/C0/C0/C0-Camera ;
    Coordinate : /C1/C0-Joint ;
    Coordinate : /C1/C0/C0-Joint ;
    Coordinate : /C1/C0/C0/C0-Joint ;
    Coordinate : /C1/C0/C0/C0/C0-TouchSensor :
    Coordinate : /C2/C0-Joint ;
    Coordinate : /C2/C0/C0-Joint ;
    Coordinate : /C2/C0/C0/C0-Joint ;
    Coordinate : /C2/C0/C0/C0/C0-TouchSensor :
    Coordinate : /C3/C0-Joint ;
    Coordinate : /C3/C0/C0-Joint ;
    Coordinate : /C3/C0/C0/C0-Joint ;
    Coordinate : /C3/C0/C0/C0/C0-TouchSensor :
    Coordinate : /C4/C0-Joint ;
    Coordinate : /C4/C0/C0-Joint ;
    Coordinate : /C4/C0/C0/C0-Joint ;
    Coordinate : /C4/C0/C0/C0/C0-TouchSensor :
}
```

FIG.9

```
#OPEN-R Service <---> TCP/IP port
#(format)
#ServiceName1 port host
#ServiceName2 port host
#    :

# BeNet < = PostureSC, SoundSC, VisionSC, ObstacleSC
TCPGateway.visonSC_Result.OSemanticsInputData.S       9009 43.13.50.106
TCPGateway.ObstacleSC_visonSC.OSemanticsInputData.S   9007 43.13.50.106
TCPCateway.postureSC_ControlKeep.OSemanticsInputData.S 9001 43.13.50.106
TCPGateway.soundSC_ResultKeep.OSemanticsInputData.S   9002 43.13.50.106
                                                      9003 43.13.50.106
```

FIG.21

```
//
// connect. ctg
//
// Copyright (C) 1999 ABCD Corporation
// All Rights Reserved.
//

// LE2_S
OMLE2_S.Effector.OCommandVectorData.S,OVirtualRobotComm.Effector.OCommandVectorData.0
OVirualRobotComm.Sensor.OSensorFrameVectorData.S,OMLE2_S.Sensor.OSensorFrameVectorData.0
OMoNet.StartMotion.OMoNetMessage.S,OMLE2_S.Cntrl.OMoNetMessage.0
OMLE2_S.Results.OMoNetMessage.S,OMoNet.ReturnStatus.OMoNetMessage.0
OMLE2_S.Register.OMoNetMessage.S,OMoNet.RegisterMotion.OMoNetMessage.0

// OMTE
OMTE.Effector.OCommandVectorData.S,OVirtualRobotComm.Effector.OCommandVectorData.0
OVirtualRobotComm.Sensor.OSensorFrameVectorData.S,OMTE.Sensor.OSensorFrameVectorData.0
OMoNet.StartMotion.OMoNetMessage.S,OMTE.Contrl.OMoNetMessage.0
OMTE.Results.OMoNetMessage.S,OMoNet.ReturnStatus.OMoNetMessage.0
OMTE.Register.OMoNetMessage.S,OMoNet.RegisterMotion.OMoNetMessage.0
OMCdt.ChannelO.CdtResults.S,OMTE.Image.CdtResults.0

// OMSE
```

FIG.25

OMSE.Effector.OCommandVectorData.S,OVirtualRobotComm.Effector.OCommandVectorData.O OVirualRobotComm.Sensor.OSensorFrameVectorData.S,OMSE.Sensor.OSensorFrameVectorData.O OMoNet.StartMotion.OMoNetMessage.S,OMSE.Cntrl.OMoNetMessage.O OMSE.Results.OMoNetMessage.S,OMoNet.ReturnStatus.OMoNetMessage.O OMSE.Register.OMoNetMessage.S,OMoNet.RegisterMotion.OMoNetMessage.O

// OMNE

OMNE.Effector.OCommandVectorData.S,OVirtualRobotComm.Effector.OCommandVectorData.O OVirtualRobotComm.Sensor.OSensorFrameVectorData.S,OMNE.Sensor.OSensorFrameVectorData.O OMoNet.StartMotion.OMoNetMessage.S,OMNE.Contrl.OMoNetMessage.O OMNE.Results.OMoNetMessage.S,OMoNet.ReturnStatus.OMoNetMessage.O OMNE.Register.OMoNetMessage.S,OMoNet.RegisterMotion.OMoNetMessage.O // OMPsd OVirtualRobotComm.Sensor.OSensorFrameVectorData.S,OMPsd.Sensor.OSensorFrameVectorData.O

// OMCDT

OVitualRobotComm.FBK_M_YUVC.OImageVector.S,OMCdt.Image.OImage.Vector.O

FIG.26

```
OMCdt.CdtTable,OCdtVectorData,S,OVirtualRobotComm.SetCdtVector.OCdtVectorData.O
// OMGsensor
OVirtualRobotComm.Sensor.OSensorFrameVectorData.S,omG.UpdateData.OSensorFrameVectorData.O
// SoccerDog
SoccerDog.SetBCParam.OMBatteryClockParam.S,omBC.Parameter.OMBatteryClockParam.O
SoccerDog.SetMotion.OMoNetMessage.S,OMoNet.Move.OMoNetMessage.O
SoccerDog.SetPSDParam.PsdCntrl.S,OMPsd.ParamCntrl.PsdCntrl.O
SoccerDog.SetCDTTable.CdtCntrl.S,OMCdt.Command.CdtCntrl.O
OMoNet.FinishCommand.ONoNetMessage.S,SoccerDog.GetMotionResult.OMoNetMessage.O
OVirtualRobotComm.Sensor.OSensorFrameVectorData.S,SoccerDog.Sensor.OSensorFrameVectorData.O
OMPsd.Result.PsdResults.S,SoccerDog.GetPSDResult.PsdResults.O
OMCdt.ChannelO.CdtResults.S,SoccerDog.GetCDTResult.CdtResults.O
omG.Control_E.OMGsensorMessage.S,SoccerDog.GetGResult.OMGsensorMessage.O
```

FIG.27

COMMUNICATION DEVICE AND COMMUNICATION METHOD NETWORK SYSTEM AND ROBOT APPARATUS

TECHNICAL FIELD

This invention relates to a communication device and a communication method for carrying out communication between electronic equipments, an information processing system for carrying out information processing, a program preparation method for preparing a program, a network system, and a robot apparatus.

BACKGROUND ART

Recently, pet-like robot apparatuss which behave like animals have been proposed. For example, a robot apparatus has its behavior prescribed by a program or the like for carrying out inter-process communication between a plurality of processes.

Meanwhile, it requires a great deal of time and labor to develop software which operates on a target board in a built-in equipment for carrying out complicated processing as in the robot apparatus in real time. This is due to the following reasons.

(1) Few means are available for monitoring the state of the program operating on the target board.

(2) Since no device for displaying the internal state is usually provided on the target board, there is employed a technique of communicating with a remote machine by a certain method so as to send internal information and then confirming the information with the console of the remote machine. In such a case, a communication code must be embedded into the program on the target board.

(3) If the communication technique is not made common, a communication code must be prepared for each program which a user wants to debug. The simplest way of such a technique is to insert a print sentence into a source code and confirm it at a terminal using serial communication. This technique is a so-called print sentence debugging technique. This primitive technique is still used in many systems.

(4) As for many real-time operating systems (OS), since a real-time task by a user is executed in the kernel space, the system will be destroyed by unauthorized processing of the task. Even if the user wants to investigate the cause of such destruction, the cause cannot be found because the system is destroyed. If print sentence debugging has been carried out, re-compiling might change the arrangement of codes and therefore change the behavior of the bug, making it more difficult to find the cause.

(5) Since a real-time task by a user is linked to the kernel space, a change of a user program requires re-link and rerun of the whole system. For example, even insertion of one line of print sentence requires re-link and rerun all over again. This is inefficient.

DISCLOSURE OF THE INVENTION

Thus, in view of the foregoing status of the art, it is an object of the present invention to provide a communication device and a communication method, an information processing system, a program preparation method, a network system, and a robot apparatus which facilitate changes between software (process) components.

A communication device according to the present invention comprises: first communication means having an information processing process for transmitting and receiving data to and from an information processing process of a first electronic equipment; and second communication means having an information processing process for transmitting and receiving data to and from an information processing process of a second electronic equipment. When the first communication means and the second communication means are connected with each other by radio or wired connection, inter-process communication is carried out between the information processing process for transmitting and receiving data of the first communication means and the information processing process for transmitting and receiving data of the second communication means, thus carrying out inter-process communication between the information processing process of the first electronic equipment and the information processing process of the second electronic equipment.

In the communication device having such a structure, since the inter-process communication between the information processing object of the first communication means and the object of the second communication means behaves like inter-process communication on the same system, the communication between the information processing process of the first electronic equipment and the information processing process of the second electronic equipment is handled as inter-process communication on the same system.

A communication method according to the present invention comprises the steps of connecting first communication means having an information processing process for transmitting and receiving data to and from an information processing process of a first electronic equipment, with second communication means having an information processing process for transmitting and receiving data to and from an information processing process of a second electronic equipment, by radio or wired connection, and carrying out inter-process communication between the information processing process for transmitting and receiving data of the first communication means and the information processing process for transmitting and receiving data of the second communication means, thus carrying out inter-process communication between the information processing process of the first electronic equipment and the information processing process of the second electronic equipment.

In such a communication method, since the inter-process communication between the information processing object of the first communication means and the object of the second communication means behaves like inter-process communication on the same system, the communication between the information processing process of the first electronic equipment and the information processing process of the second electronic equipment is handled as inter-process communication on the same system.

An information processing system according to the present invention comprises: an electronic equipment controlled by an information processing process; an information processing device in which an information processing process used for controlling the electronic equipment is taken and which handles the information processing process; and communication means for carrying out radio or wired communication between the electronic equipment and the information processing device. The information processing device carries out communication using the communication means between the information processing process of the electronic equipment when the electronic equipment is being operated and the information processing process taken therein, then uses data transmitted from the information processing process of the electronic equipment, and handles the information processing process taken therein.

In this information processing system, the information processing device handles the information processing process which takes into account the electronic equipment in the real environment.

A program preparation method according to the present invention comprises: a program preparation step of carrying out radio or wired communication using communication means between an information processing process of an electronic equipment when the electronic equipment controlled by the information processing process is being operated and information processing process on an information processing device, and using data transmitted from the information processing process of the electronic equipment and preparing an information processing process used for the electronic equipment, at the information processing device; and a program embedding step of embedding the information processing process prepared at the program preparation step into the electronic equipment.

In such a program preparation method, the information processing device prepares the information processing process in consideration of the electronic equipment in the real environment, and the information processing process prepared in consideration of the environment is embedded into the electronic equipment, which operates on the basis of the information processing process.

A network system according to the present invention in which a robot apparatus with an operation control program constructed by inter-object communication and a computer system constructed by inter-object communication carry out data communication via wired or radio communication, comprises a gateway object for carrying out dynamic protocol conversion between the inter-object communication and network communication between the robot apparatus and the computer system.

A communication method according to the present invention in which a robot apparatus constructed by having inter-object communication and a computer system constructed by having inter-object communication carry out data communication via wired or radio communication, comprises carrying out protocol conversion between the inter-object communication and network communication between the robot apparatus and the computer system.

A robot apparatus according to the present invention which has an operation control program constructed by inter-object communication and which carries out data communication via wired or radio communication with a computer system constructed by inter-object communication, comprises a gateway object for carrying out dynamic protocol conversion between the inter-object communication and network communication with the computer system.

BRIEF DESCRIPTION OF THE DRAWINGS

FIG. 8 is a chart showing the description of a design file.

FIG. 9 is a chart showing connection information.

FIG. 21 is a view showing the description of a port.cfg file.

FIG. 25 is a view showing a former half part of a connection file.

FIG. 26 is a view showing a middle part of the connection file.

FIG. 27 is a view showing a latter half part of the connection file.

BEST MODE FOR CARRYING OUT THE INVENTION

An embodiment of the present invention will now be described in detail with reference to the drawings. In this embodiment, the present invention is applied to a network system to which a pet-like robot apparatus having software (object) constructed by an object-oriented system is connected via wired or radio communication.

The pet-like robot apparatus makes, for example, gestures similar to those of a certain animal in accordance with various processing through inter-object communication (inter-process communication). It should be noted that the robot apparatus connected to the network system is not limited to the pet-like robot apparatus and may be constructed within the scope of this invention. The structure of the robot apparatus will be first described and then the network system to which the present invention is applied will be described in detail.

(1) Structure of Robot Apparatus (1-1) Overall Structure

Figure 1:
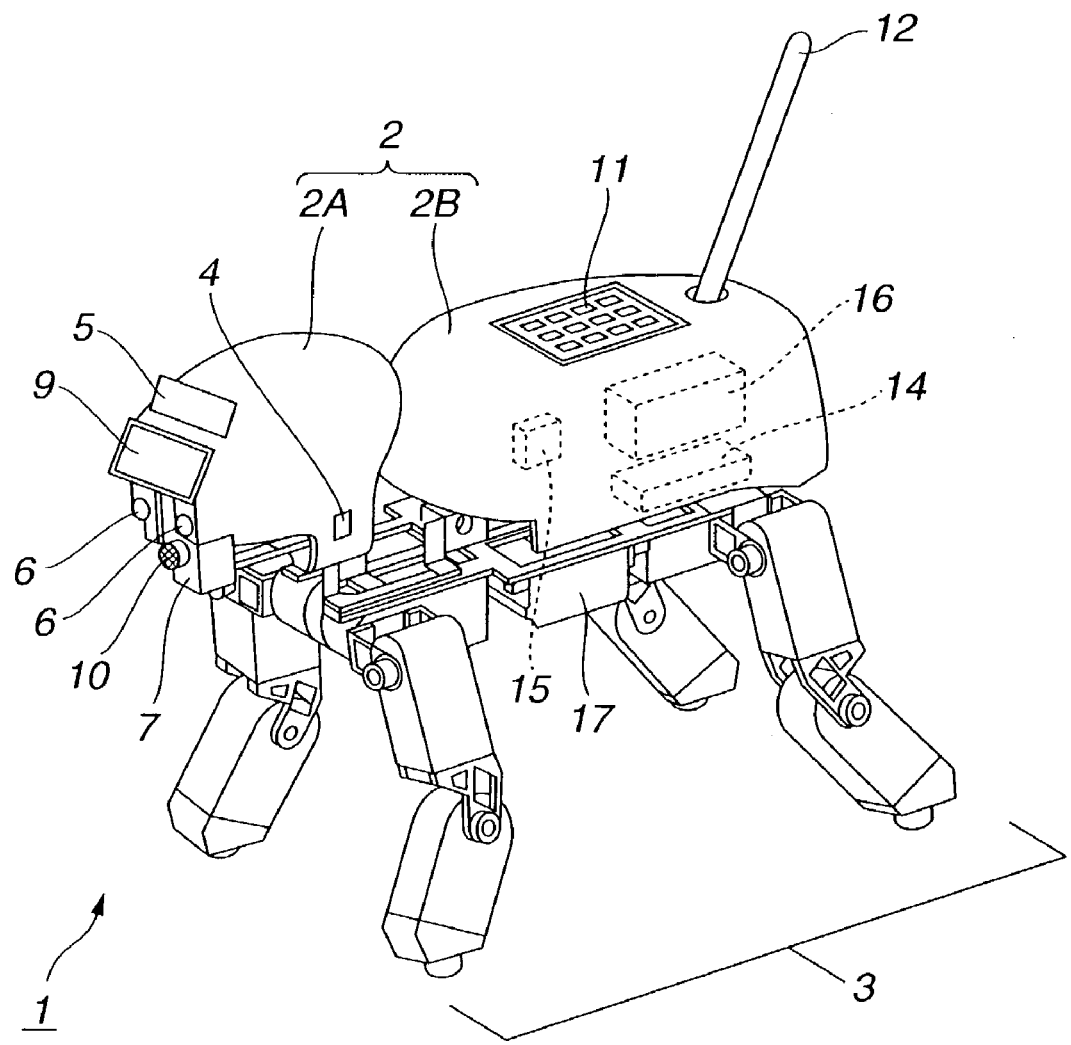
FIG. 1 is a perspective view showing the structure of a robot apparatus according to an embodiment of the present invention.

A robot apparatus 1 is a so-called pet-like robot apparatus which has a dog-like shape as a whole and can walk with four legs, as shown in FIG. 1. That is, the robot apparatus 1 includes a moving unit 3 mounted on a body 2, and the body 2 is constituted by a head part 2A and a trunk part 2B.

The head part 2A has arranged thereon a microphone 4, a touch sensor 5, a television camera 6 capable of realizing stereoscopic vision, a remote-controlled infrared receiving portion 7 and the like, and can acquire various information by using these parts. The head part 2A also has an image display portion 9 and a speaker 10 arranged thereon and can output various information. However, the structure of the head part 2A is not limited to such a structure. For example, the image display portion 9 may be constituted by an LED (light-emitting diode) so as to give expressions.

The trunk part 2B has an operator 11 arranged on its back portion and also has an antenna 12 arranged at a site corresponding to the tail, so that the operation by the user can be detected via the operator 11 and the antenna 12. The trunk part 2B also has a slot so that an IC card is loaded into the slot to enable execution of version up of the software and the like.

Moreover, a controller 15 for processing various information inputted and outputted via the head part 2A and operation information of the operator 11 and the like, a power-supply unit 14 for supplying power to each part, and a communication unit 16 for transmitting and receiving various information via the antenna 12 are arranged on the trunk part 2B, and a battery 17 is arranged on the lower part thereof.

On the other hand, the moving unit 3 is formed by arranging four legs, each of which has an actuator and an angle detection sensor at a site corresponding to the joint. The moving unit 3 is connected to the body 2 by a serial bus and operates under the control of the body 2. Thus, the robot apparatus 1 can move by four-legged walking.

Moreover, the rear legs of the moving unit 3 can be detached from the body 2. In the robot apparatus 1, a moving unit having wheels can be attached instead of the rear legs. Thus, the form of this robot apparatus 1 can be changed between the four-legged moving form (hereinafter referred to as four-legged type) and the wheeled moving form (hereinafter referred to as wheeled type) in accordance with the preference of the user.

Figure 2:
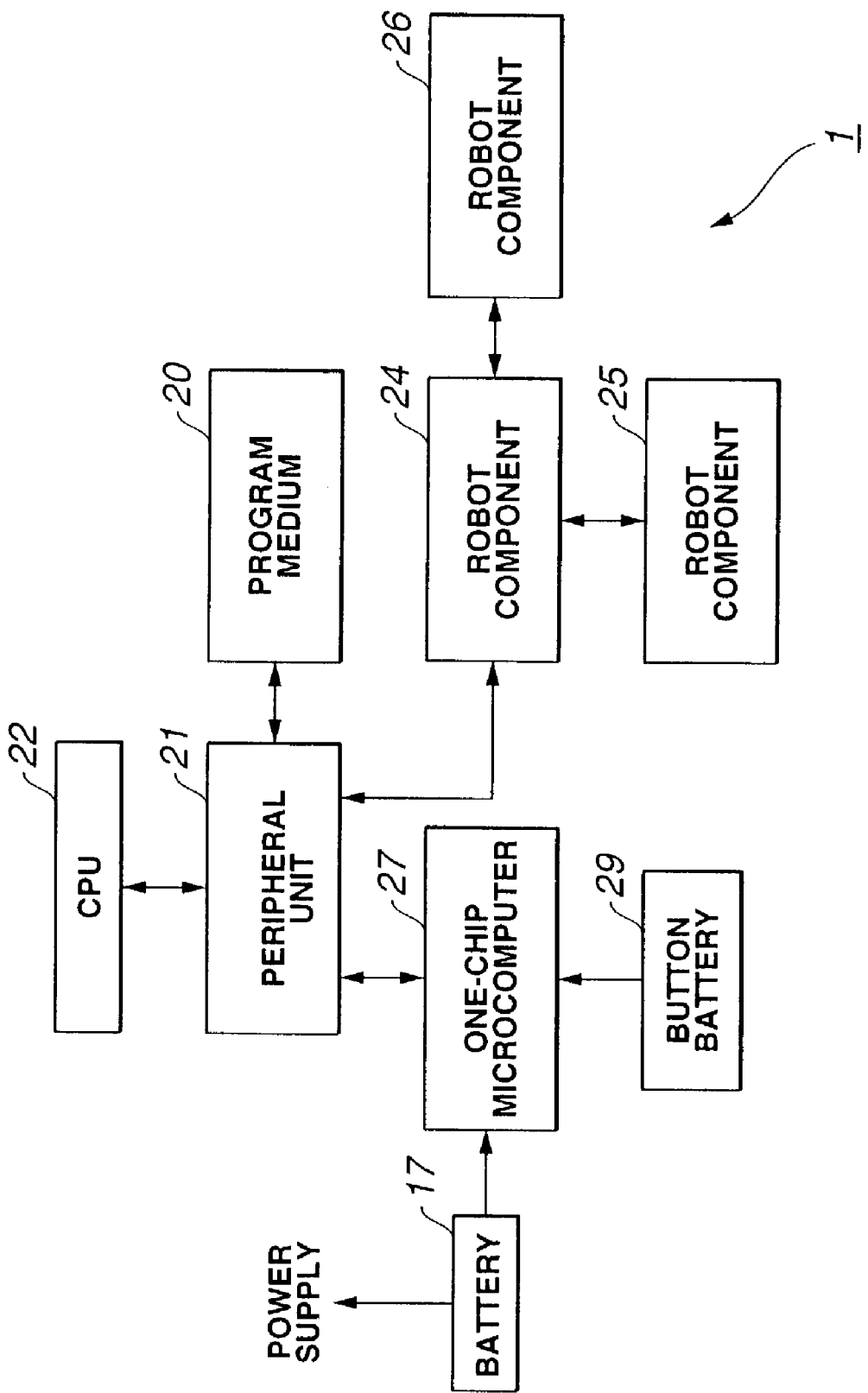
FIG. 2 is a block diagram showing the structure of the robot apparatus.

FIG. 2 is a block diagram showing the structure of this robot apparatus 1. In the robot apparatus 1, a program medium 20 having a processing program recorded thereon is connected to a central processing unit 22 via a peripheral unit 21, and the central processing unit 22 executes the processing procedure recorded on the program medium 20. The central processing unit 22 is also connected with robot apparatus components 24, 25, 26, which are the actuators and sensors of the moving unit 3, the television camera 6, the operator 11 and the like via the peripheral unit 21, and can thus control the overall operation.

Similarly, the central processing unit 22 is connected with a one-chip microcomputer 27 for power control which constitutes the power-supply unit 14, via the peripheral unit 21, and controls the operation of the one-chip microprocessor 27 to supply power to the whole body from the battery 17, and in a power-saving mode, to supply power to the whole body from a button battery 29 instead of the battery 17.

(1-2) Software Structure

Figure 3:
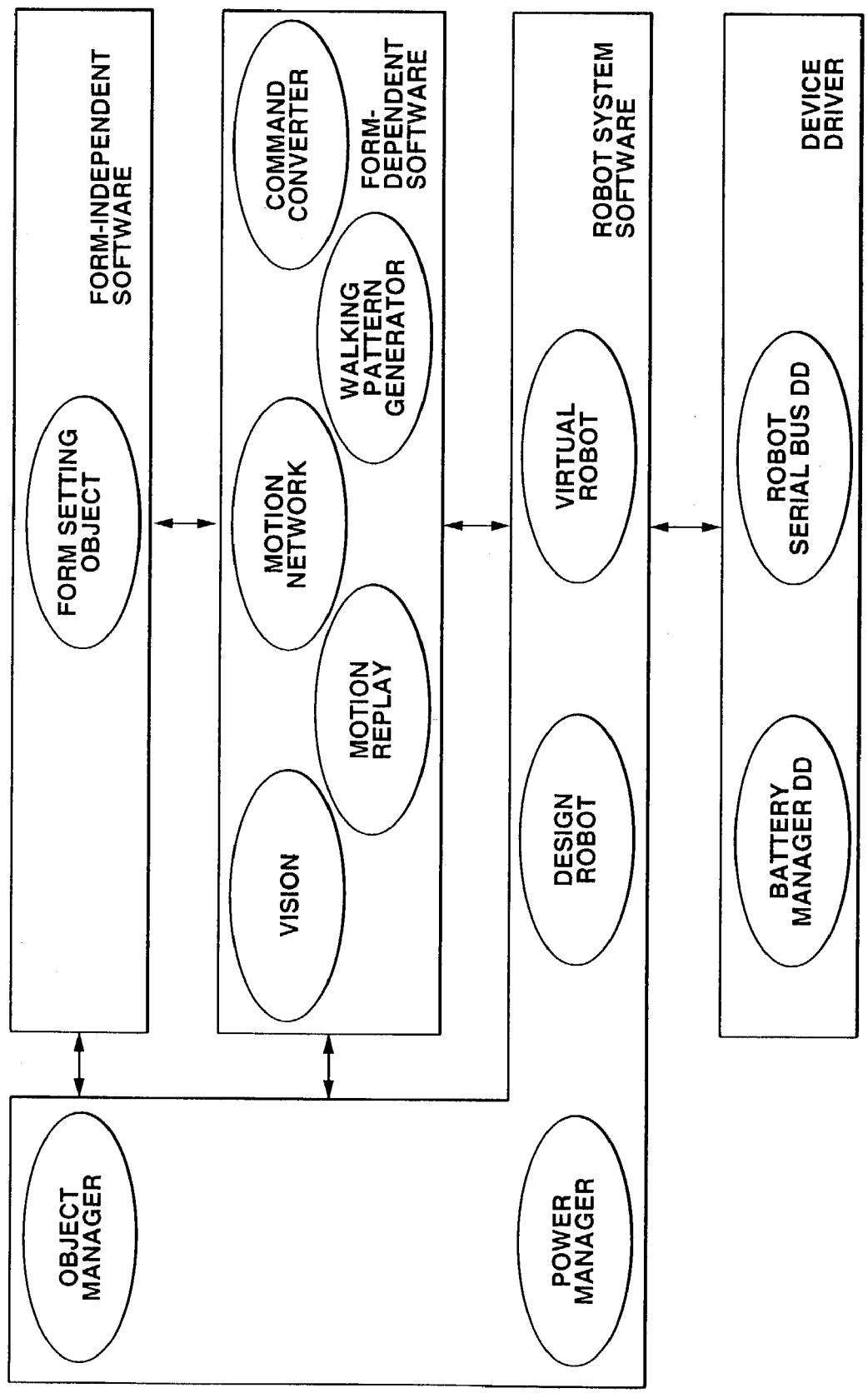
FIG. 3 is a diagram showing the software structure of a four-legged type.
Figure 4:
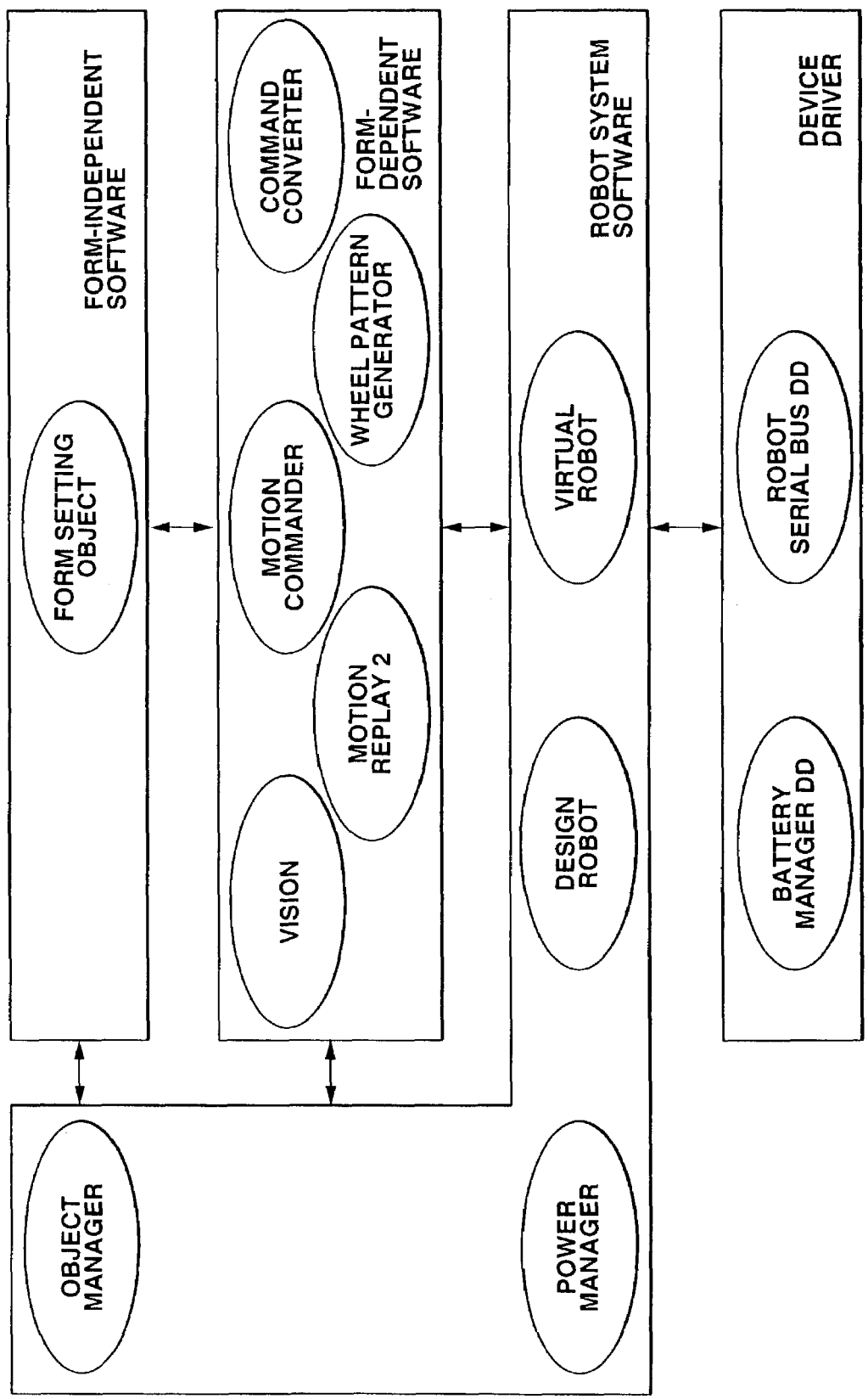
FIG. 4 is a diagram showing the software structure of a wheeled type.

FIG. 3 is a diagram showing, as layers, the software structure of the robot apparatus 1 of the four-legged type. FIG. 4 is a diagram showing the software structure of the wheeled type in comparison with FIG. 3. In these software structures, the lowermost layer is a device driver layer, where various device drivers are arranged. The device drivers carry out input/output of various information from/to the sensors and actuators of the moving unit 3 and the various robot apparatus components arranged on the head part 2A and the like, and have software objects for processing such information.

Of these device drivers, a battery manager device driver (battery manager DD) detects the remaining power of the battery 17 through data communication with the one-chip microcomputer 27 of the power-supply unit 14, and periodically notifies upper-layer robot system software of the detected remaining power. The battery manager device driver also manages the clock of the central processing unit 22 or the like, then reduces the frequency of the clock in accordance with an instruction from the robot system software and stops the operation of unnecessary devices, thus reducing the overall power consumption.

A robot serial bus device driver (robot serial bus DD) takes sensor information and the like of the moving unit 3 connected to the serail bus arranged in the body 2 through data communication with hardware for master control of the serial bus, and notifies the upper-layer robot system software of the sensor information and the like. Moreover, the robot serial bus device driver sends control data of the actuator, audio signals and the like outputted from the robot system software, to the respective devices.

In start-up of the system, the robot serial bus device driver detects a change (addition or deletion) of a device connected to the serial bus. Furthermore, the robot serial bus device driver takes information proper to the device related to this change and thus outputs information indicating the current form of the robot apparatus 1 to the robot system software.

The robot system software is arranged on the upper layer than the device driver layer. The robot system software is constituted by software objects such as a virtual robot, a design robot, a power manager, and an object manager.

Of these software objects, the virtual robot converts data of a format proper to each device to a common format of the robot apparatus and then transmits and receives the data, in data communication with the robot serial bus device driver. Specifically, for example, with respect to motor control data, a sensor output of a potentiometer in a format proper to the device is expressed by 10-bit data resulting from analog-digital conversion, whereas the virtual robot converts the data of this expression to data such that the lowest one bit indicates 0.001 degrees and outputs the data in a common format in the robot apparatus 1. Moreover, in addition to such transmission/reception of format-converted data, the virtual robot outputs image data acquired by, for example, the television camera 6, to the upper software.

The virtual robot also receives information indicating the current form of the robot apparatus 1 from the robot serial bus device driver and put the information together. Thus, the virtual robot manages connection information (CPC (configurable physical component) connection information) indicating which robot component is connected in what order in the whole robot apparatus 1, and notifies the design robot of this connection information (CPC connection information).

If a change is made in a device connected to the serial bus, the virtual robot receives a notification from the robot serial bus device driver of the device driver layer and notifies the design robot.

The design robot receives the connection information (CPC connection information) from the virtual robot, then sequentially compares the received connection information with pre-recorded connection template information, and thus selects a template suitable for the current form of the robot apparatus 1. Moreover, in accordance with the selected template, the design robot instructs the object manager to update form-dependent software on the upper layer to form-dependent software suitable for the current form.

In this embodiment, the connection template information is described as design data in a design file.

In accordance with the instruction from the design robot, the object manager updates the form-dependent software to form-dependent software suitable for the current form, using the information relating to objects and connection of the respective objects sent from the design robot. Specifically, the object manager give instructions to stop the operation, cancel the connection of inter-object communication, demolish the object, and open the resource, with respect to all the objects constituting the form-dependent software. The object manager gives further instructions to load newly required objects, initialize the objects, construct connection for inter-object communication, and start up these objects. The connection between objects means the connection for transmitting and receiving data between the objects.

The power manager communicates data with the battery manager device driver, and in accordance with the instruction from the software of the upper layer (form-independent software or form-dependent software), the power manager instructs the battery manager device driver to switch the clock and to stop the operation of the object.

The form-dependent software is arranged on the upper layer than the robot system software, and the form-independent software is arranged on the further upper layer. The form-dependent software is the software which is changed in accordance with the form of the robot apparatus 1, and the form-independent software is the upper software of the robot apparatus 1 which is fixed irrespective of the form of the robot apparatus 1. Therefore, various objects depending on the form of the robot apparatus 1 exist in the form-dependent software. In this embodiment, the software suitable for the form of the four-legged type and the form of the wheeled type can be easily constituted by changing the form-dependent software.

Specifically, in the four-legged type, the form-dependent software (FIG. 3) is constituted by objects including a command converter, a motion network, a motion replay, a walking pattern generator, and a vision, as the objects related to the moving unit 3.

The command converter converts a command from the form-independent software which is independent of the form, to a command suitable for the form of the robot apparatus 1. That is, when a command which give an instruction to take a posture to sleep, rest, wake up, or move (command Sleep, Rest, Wakeup or Move) is inputted from the form-independent software as a command related to the moving unit 3, the command converter in the four-legged type converts the command to a command which gives an instruction to take a posture of sleeping, sitting, standing, or walking (command Sleeping, Sitting, Standing or Walking).

Figures 5, 6:
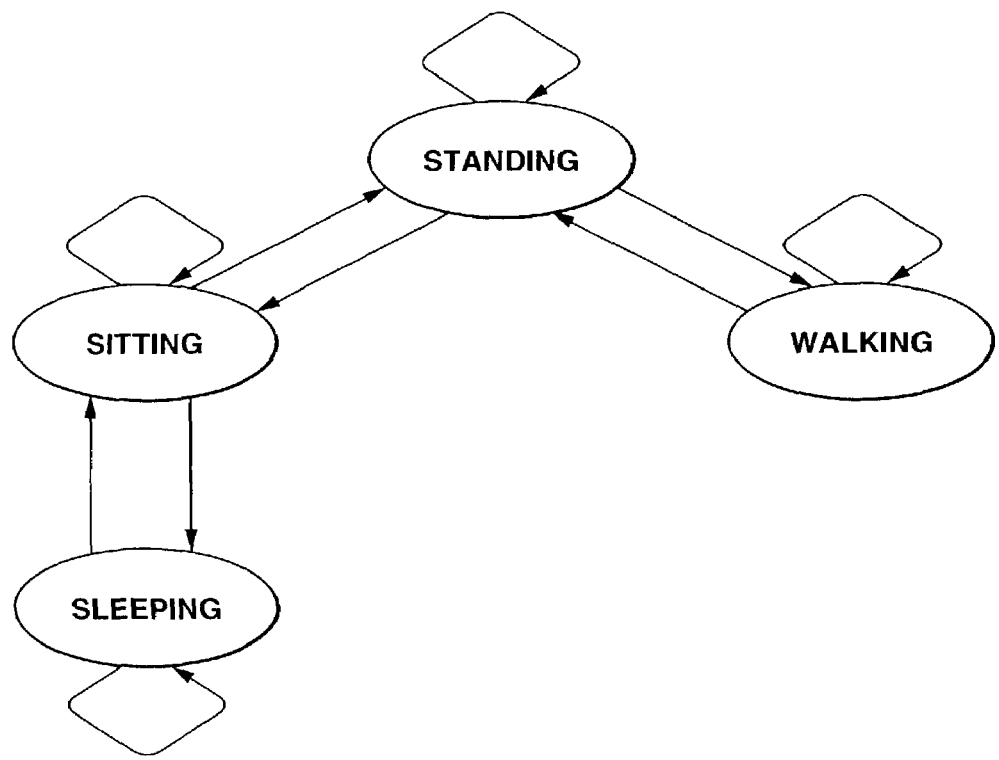
FIG. 5 is a state transition view showing changes in the posture of a four-legged type.
FIG. 6 is a chart showing the relation between input and state.

The motion network starts a method (entry) of an object corresponding to an arrow shown in the transition view of FIG. 5, in accordance with the command indicating the posture outputted from the command converter. That is, if a command for walking is inputted in the sleeping state, the corresponding entries of the motion replay object are sequentially started so that the posture is sequentially changed to sitting, standing and walking. In this case, when the ultimate walking state is reached, an entry of the walking pattern generator corresponding to the self-loop indicating this state is started.

The motion replay outputs joint angle command values for the corresponding posture changes by starting entries of the motion network. Specifically, the motion replay holds registered discrete joint angle command values as key data and outputs a series of angle command values by interpolation processing using the key data.

The walking pattern generator calculates and outputs each joint angle command value so as to move in a direction designated by the form-independent software.

The vision is, for example, an object for image processing, and carries out processing to receive image data acquired by the television camera 6 from the virtual robot object. Thus, the vision identifies, for example, a red object, and detects and outputs the position and apparent size of the red object with reference to the robot apparatus 1.

On the other hand, in the wheeled type, the form-dependent software (FIG. 4) is constituted by objects including a vision object which is common to this wheeled type and the four-legged type, and a command converter, a motion commander, a motion replay 2, and a wheel pattern generator which are specific to the wheeled type, as the objects related to the moving unit 3.

Of these objects, the command converter converts a command from the form-independent software which is independent of the form, to a command suitable for the form of the robot apparatus 1, similarly to the command converter in the four-legged type. In this case, since the robot apparatus 1 is of the wheeled type, the command converter converts commands which give instructions to take postures to sleep, rest, wake up, and move (commands Sleep, Rest, Wakeup and Move), to commands which give instructions to take postures of sleeping, resting, being ready, and going (commands Sleeping, Rest, Ready and Go).

The motion commander receives the output from the command converter and generates a joint angle command value associated with a wheel control command. That is, when the command Sleeping is inputted, the motion commander sets the joint angle command value to neutral. In the neutral state, neither driving nor braking of the motor is carried out. Therefore, the two arms constituting the moving unit are kept hanging down and the wheels are held in a stop state.

When the command Rest is inputted, the motion commander generates a joint angle command value such that the two arms are bent 90 degrees at the elbow parts and held out forward while the face part of the head part 2A faces the front. The wheels are kept stopped.

When the command Ready is inputted, the motion commander generates a joint angle command value such that the two arms are stretched out forward while the face part of the head part 2A faces the front. In this case, too, the wheels are kept stopped. When the command Go is inputted, the motion commander generates a command value such that the wheels rotate to move forward while the two arms are held similarly to the Ready state.

The motion replay 2 controls the operation of the parts other than the wheels (for example, the operation of the two arms) with respect to a motion proper to the wheeled type, in accordance with the instruction from the motion commander. The wheel pattern generator generates wheel control information under the control of the motion commander.

The form-independent software is the software which is independent of the form of the robot apparatus 1 and has a form setting object or the like. The form setting object receives information which is independent of the form of the robot apparatus 1 from the form-dependent software, and by using this information, outputs the commands (Sleep, etc.) indicating the above-described postures of the robot apparatus 1 which are independent of the form of the robot apparatus 1, to the form-dependent software.

For example, if no red object is detected for one minute or more on the basis of the presence/absence of a red object and its position information sent from the vision object, a command is issued such that the Sleep state is maintained as it is, the Rest state is shifted to the Sleep state, the Wakeup state is shifted to the Rest state, and the Move state is shifted to the Wakeup state, as shown in FIG. 6.

On the other hand, if a red object with a size smaller than a predetermined value (not more than a set value 10 of the robot apparatus) is detected and is kept detected for 10 seconds or more, a command is issued such that the Sleep state is shifted to the Rest state, the Rest state is shifted to the Wakeup state, the Wakeup state is shifted to the Move state, and the Move state is continued as it is.

If a red object with a size not less than a predetermined value is detected, a command is issued such that the Sleep state is shifted to the Wakeup state, the Rest and Wakeup states are shifted to the Move state, and the Move state is continued as it is.

Thus, in the robot apparatus 1, the uppermost software is formed to be independent of the form and the form-independent software transmits and receives data in the format independent of the form. Therefore, in the robot apparatus 1, only the form-dependent software, which is dependent on the form, is changed in accordance with the form, thus enabling easy change of software in accordance with the form.

(1-3) Change of Form-Dependent Software

In the robot apparatus 1, the form-dependent software is updated by the processing at the object manager in accordance with an instruction from the design robot. In this case, the form-dependent software is updated by constructing the reconnection for loading, unloading, and inter-object communication of the objects constituting the form-dependent software.

Therefore, the design robot receives a notification of connection information (CPC connection information) specifying the form of the robot apparatus 1 from the virtual robot. On the basis of the connection information (CPC connection information), the design robot instructs the object manager to update the form-dependent software and provides necessary information to the object manager.

The virtual robot acquires information of each device connected to the serial bus via the robot serial bus device driver on the lower layer, then uses this information to prepare connection information (CPC connection information) and sends the connection information to the design robot.

Therefore, in the robot apparatus 1, predetermined information is recorded into the memory of each robot component, and the information of the device connected to the serial bus in the virtual robot can be acquired together with its position information through data communication carried out via the robot serial bus device driver.

In the robot apparatus 1, the television camera, the speaker, the microphone, the various actuators, the sensors and the like are the basic constituent elements (CPC primitives) and a plurality of combinations of these basic constituent elements set in a link state constitute respective components (CPC models). For example, one leg as a component is constituted by a plurality of basic constituent elements consisting of three motors and one switch in a specific link state.

In the robot apparatus 1, proper identification data are allocated to the respective components so that the respective constituent elements connected to the serial bus can be specified by using the identification data. The identification data includes the ID of the factory where the component was manufactured and the ID corresponding to the serial number. Moreover, corresponding to this identification data, the information of each constituent element and the position information of each constituent element in the component are set by link information of each constituent element in the component and attribute information of each constituent element, and such information is held in the memory of each component together with the identification data of each component. In this embodiment, if the component has a small memory capacity, only the identification data is recorded in the memory of each component, and the information of the constituent elements and the position information of the constituent elements in the component are held in the body 2.

At the start-up of the system, or when the device is changed, the virtual robot sequentially traces the serial bus of the tree structure in accordance with the identification data, the position information and the like sent from the robot serial bus device driver, then prepares connection information (CPC connection information) by using the respective basic constituent elements (CPC primitives) and the data structure representing the order of connection of the respective constituent elements, and notifies the design robot of the connection information. In this case, the connection information (CPC connection information) sent by the virtual robot is constituted by constituent element information (CPC primitive location information) corresponding to the form.

The design robot refers to the design file on the basis of the connection information (CPC connection information) sent from the virtual robot and thus selects a connection template (that is, a label which will be described later) corresponding to the current form of the robot apparatus 1. Moreover, in accordance with the selected template, the design robot instructs the object manager to update the form-dependent software to form-dependent software suitable for the current form.

The design file includes description of the text data format, in which a group of constituent element information (CPC primitive location information) of each component is described with a label appended thereto, for each form of the robot apparatus 1. The constituent element information (CPC primitive location information includes the basic constituent elements (CPC primitives) of each component and the position information (CPC coordinate locator) of each constituent element. Of such information, the position information (CPC coordinate locator) is the coordinate from a reference position set for the robot apparatus 1. The coordinate is represented by a general link coordinate system and is constructed by cascade connection of a rotation matrix and a positional vector for transformation of the coordinate system.

The label specifies the corresponding object and also specifies the necessary data for loading of the object and construction of inter-object communication. A design label, or a virtual label having the description which is more general and easier to understand than a design label, or a composite label constituted by combining a design label and a virtual label is applied. A visual label is replaced with a design label by the design robot for use.

The following formula represents the description of the design label. The design label is constituted by one or more pieces of constituent element information (CPC primitive location information) or a design label (Design Label).

```
Design Label (                                                          (1)
    CPC Primitive Location Information or Design Label;
    ...
)
```

On the other hand, the following formula represents the description of the virtual label (Virtual Label). The virtual label is constituted by a design label (Design Label), a constituent element (CPC Primitive), and position information (CPC Coordinate Locator) of the constituent element (CPC Primitive).

```
Virtual Label (                                                         (2)
    Design Label:
    CPC Primitive:
    CPC Coordinate Locator:
)
```

The following formula represents the description of the composite label (Composite Label).

```
Composite Label (                                                       (3)
    Composite Label;
    or/and Design Label:
    or/and Virtual Label;
)
```

In this case, if there exits the position information (CPC coordinate locator) defined within the virtual label on the distal end side of the tree structure from the specified position information (CPC coordinate locator) in the constituent element information (CPC primitive location information) specified by the connection information (CPC connection information) sent to the design robot, the design robot replaces the virtual label with the design label and sets such a design label to be effective.

Thus, by accessing the design file in accordance with the connection information (CPC connection information), the current form (such as the four-legged type and the wheeled type) of the robot apparatus can be specified and various data necessary for updating the form-dependent software can be acquired.

Figure 7:
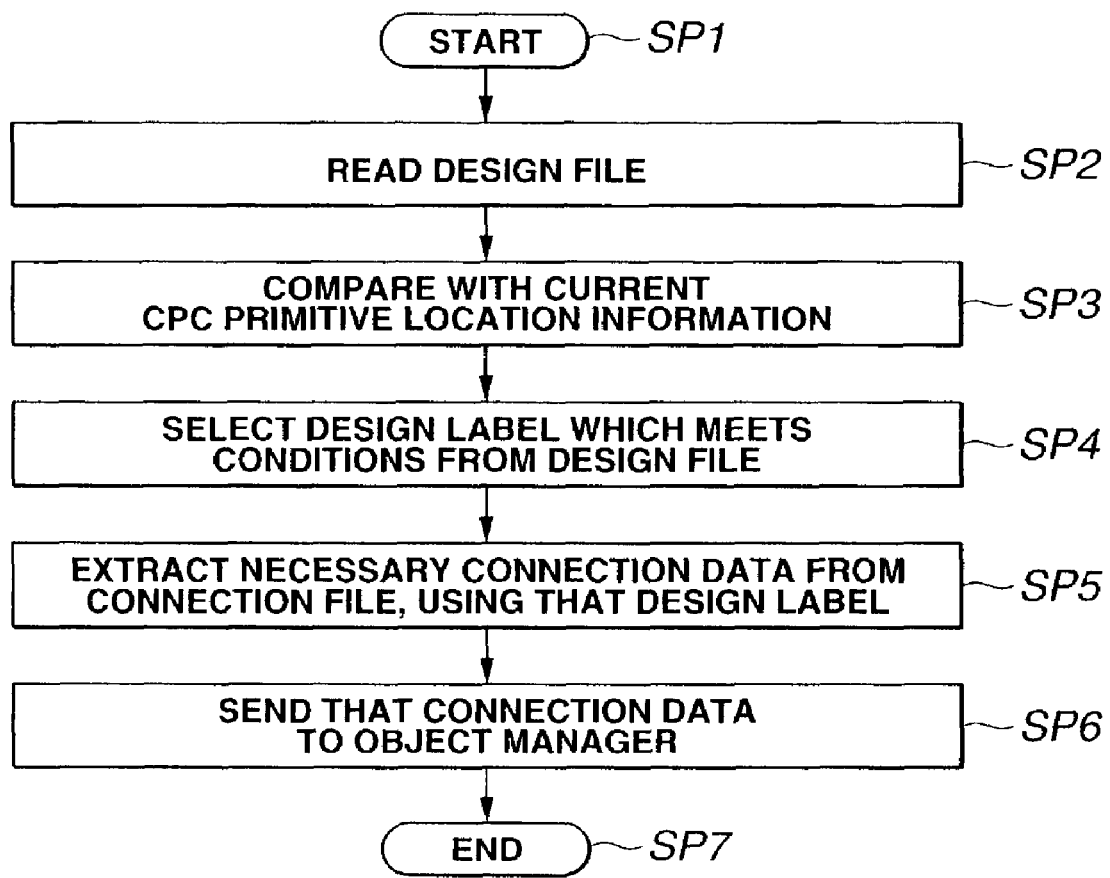
FIG. 7 is a flowchart showing the processing procedure of a design robot.

FIG. 7 is a flowchart showing the specific processing procedure of the design robot. When the design robot is notified of connection information (CPC connection information) from the virtual robot, the processing shifts from step SP1 to step SP2 to access the design file in accordance with the connection information (CPC connection information), thus specifying the current form of the robot apparatus 1.

Then, the processing at the design robot shifts to step SP3 to compare the constituent element information (CPC primitive location information) based on the connection information (CPC connection information) sent from the virtual robot with the constituent element information (CPC primitive location information) based on the connection information (CPC connection information) held in the design file.

The processing at the design robot shifts to step SP4. The design file is accessed on the basis of the result of the comparison and a design label is detected which specifies an object corresponding to the current form and necessary data for reconstructing inter-object communication.

Then, the processing at the design robot shifts to step SP5. A connection file is accessed in accordance with the detected design label and the connection information corresponding to the label is detected, thereby acquiring necessary data for specifying the corresponding object and for reconstructing inter-object communication. In this case, the connection file is a file in which the connection information (connection data) is recorded in association with the label. The connection information (connection data) is necessary data for specifying the corresponding object and for reconstructing inter-object communication.

The processing at the design robot shifts to step SP6. The connection information (connection data) is sent to the object manager, thus instructing the object manager to update the form-dependent software. After that, the processing shifts to step SP7 to end this processing procedure.

FIG. 8 is a chart showing the description of a part of the design file. In this design file, "DRX" is the description to represent the form of the robot apparatus 1 and 4Legged is the description to represent the form of the four-legged type. "Head," "RightFrontLeg," "LeftFrontLeg," "RightRearLeg," and "LeftRearLeg" represents a head part, a right front leg, a left front leg, a right rear leg, and a left rear leg, respectively. Thus, the first sentence specifies that the four-legged type includes a head part, a right front leg, a left front leg, a right rear leg, and a left rear leg.

"Wheel" in the second sentence represents the wheeled type. Compared with the first sentence, the second sentence specifies that the wheeled type includes a head part, a right front leg, a left front leg, a right rear wheel, and a left rear wheel. The third sentence describes the arrangement of camera link in the head part. The fourth sentence describes a virtual label of the camera link. The fifth and subsequent sentences describe the position information (CPC coordinate locator) for the right front leg, the left front leg and the like in a tree format.

FIG. 9 is a chart showing the description of a part of the connection information (CPC connection information). The connection information is described in a text data format similar to the design file. In this description, "Joint" represents an interface, indicating that this portion is a connection site with another constituent element. In this case, it can be learned from the description of the second to fifth rows that a television camera is connected via five hubs or the like which are expressed as CO, CO, CO, CO, CO.

The connection information (CPC connection information) in the example of FIG. 9 coincides with the four-legged type, which is described above with reference to FIG. 8.

On the other hand, the following formula represents the description of a part of the connection file. The connection file is described in a text data format. In this description, the first sentence and second sentence describe the objects corresponding to the legs of the four-legged type and the wheels of the wheeled type, respectively, and necessary data for constructing inter-object communication for these objects.

Specifically, in the first sentence, an object name "MoNet" as a service name, a data format "MoNetOutData," and "S" representing a subject are described. Moreover, an object name "MoNetReplay" as a similar service name, a data format "MoNetOutData" and the like are described. Finally, the description of "O" representing an observer is allocated. Similarly, a subject, an observer, a data format and the like are described in the subsequent row.

```
DRX 4Legged (                                                           (4)
    MoNet.MoNetOutData . . . S, MoNetReplay.MoNetOutData . . . O
    MoNet.MoNetOutData . . . S,
    WalkingPatternGenerator.MoNetOutData . . . O
)
DRX Wheel (
    MotionConverter.MCData . . . S, MotionReplay2.MCData . . . O
    MotionConverter.MCData . . . D, Wheel.MCData . . . O
)
```

Thus, in the case of FIG. 8, the design robot extracts the connection information (connection data) (description in parentheses after DRX 4Legged) from the description of the first sentence based on DRX 4Legged, and notifies the object manager of the connection information, thereby updating the form-dependent software.

Figure 10:
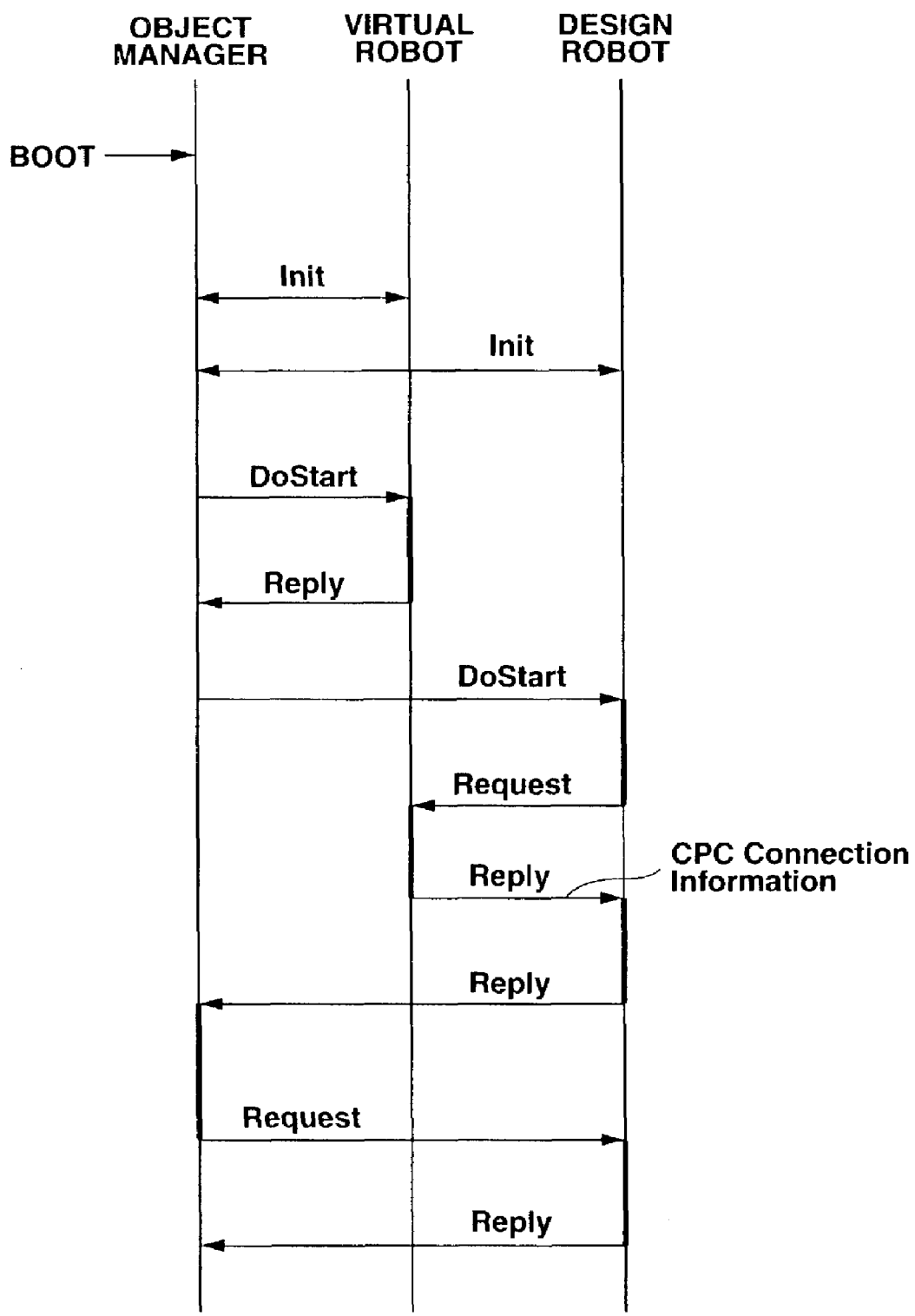
FIG. 10 is a time chart showing the operations of an object manager, a virtual robot and a design robot after boot.

FIG. 10 is a time chart showing the processing at the object manager, the virtual robot and the design robot at the time of boot. When the power of the robot apparatus 1 is turned on or the robot apparatus 1 is reset, the boot processing is started. At this point, in the robot apparatus 1, each object is loaded from the file to construct the form-dependent software, and the internal variable of each object manager is initialized.

Then, a do-initialize command (DoInit) is sent from the object manager to each object, and a query entry of each object is registered to the object manager or the like in accordance with the DoInit command. Thus, each inter-object communication is constructed on the robot system software layer.

Then, a DoStart command is sequentially sent to the virtual robot and the design robot from the object manager, and the virtual robot and the design robot start the operation. The virtual robot generates connection information (CPC connection information), and in response to a request from the design robot, this connection information (CPC connection information) is sent to the design robot, which generates connection information (connection data). Moreover, the connection information (connection data) is sent to the object manager and the form-dependent software is constructed by this connection information (connection data).

At the time of shutdown, a DoStop command is sent to each object from the object manager. In accordance with this DoStop command, each object issues an error with respect to all requests and stops the operation. Subsequently, a DoDestroy command is sent to each object from the object manager. Accordingly, each object opens the source which has been used, and deletes the entry registered to the object manager. Then, each object enters the standby state.

Thus, even if the robot apparatus 1 is booted with its form changed, it can operate by using the software suitable for the changed form.

Figure 11:
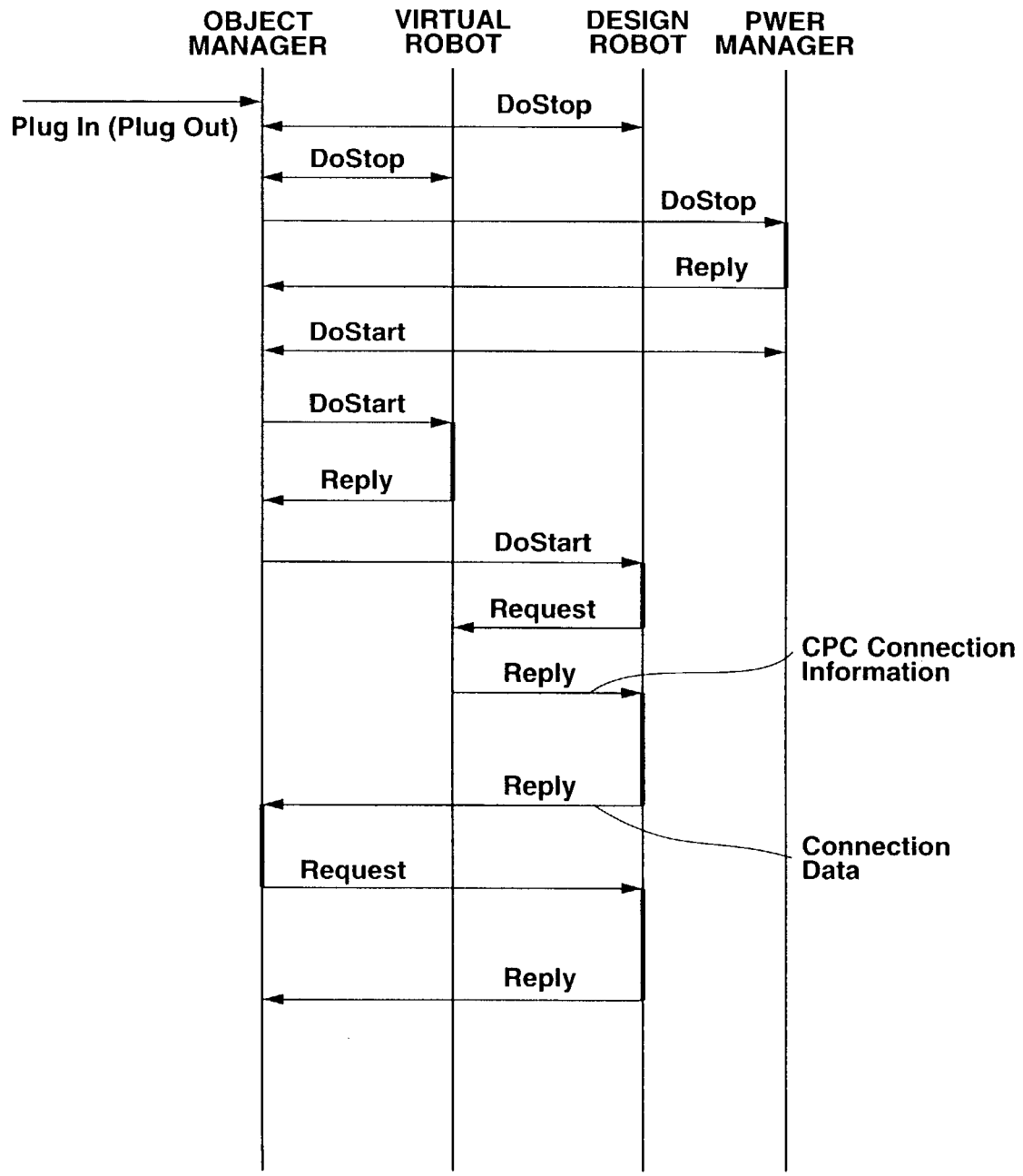
FIG. 11 is a time chart showing the operations of an object manager, a virtual robot and a design robot at Plug-In or Plug-Out.

Meanwhile, at the time of so-called plug-in and plug-out, a DoStop command is sent to each object from the object manager, and in accordance with this DoStop command, each object issues an error with respect to all requests and stops the operation, as shown in FIG. 11.

Then, similarly to the case of boot, a DoStart command is sequentially sent to the virtual robot and the design robot from the object manager. The virtual robot generates connection information (CPC connection information), and this connection information (CPC connection information) is sent to the design robot, which generates connection information (connection data). The form-dependent software is constructed by this connection information (connection data).

Thus, even if the form is dynamically changed by plug-in or plug-out, the robot apparatus 1 can operate by using the software suitable for the changed form.

If the battery 17 is used up, the processing in accordance with a DoStop command and a DoStart command, similar to the case of plug-in or plug-out, is repeated in response to a state change request from the battery manager. Thus, if the battery 17 is used up, the clock frequency is reduced and the operations of unnecessary devices are stopped, thus changing the state so that the robot apparatus operates by using the button battery 29. On the other hand, if a charged battery 17 is loaded, the clock frequency is increased and the operation of each device is started so that the robot apparatus operates by using the battery 17.

(1-4) Processing at Object Manager

The object manager reconstructs objects constituting the form-dependent software in accordance with the notification from the design robot which is executed as described above, and thus updates the form-dependent software. Specifically, the object manager loads or unloads the objects in accordance with the notification from the design robot and reconstructs inter-object communication corresponding to the loading and unloading, thus changing the form-dependent software.

When constructing this inter-object communication, if the corresponding object names have to be registered to the objects, the independence of the respective objects is hindered and a plurality of types of objects must be prepared so as to correspond to free forms. Therefore, in this embodiment, the object manager constructs inter-object communication on the basis of the connection information (connection data) outputted from the design robot and thus secures the independence of the objects.

The present invention is characterized in that data communication based on inter-object communication is made possible between the group of objects of the robot apparatus 1 (target board or target system) constructed by inter-object communication and the objects of the robot apparatus 1 taken into the personal computer for program preparation. As will be later described in detail, when the robot apparatus 1 and the personal computer are connected with each other by radio or wired communication means, inter-object communication is made possible by gateway objects held by the robot apparatus 1 and the personal computer, respectively, thus constructing inter-object communication between the objects on the robot apparatus 1 and the objects on the personal computer.

Hereinafter, the inter-object communication will be specifically described. In the following description, specifying object names is avoided for simplification. That is, the following description may apply to inter-object communication within the robot apparatus 1 and also to inter-object communication between the objects (gateway objects which will be described later) held by the robot apparatus 1 and the personal computer. The inter-object communication is executed asynchronously.

Figure 12:
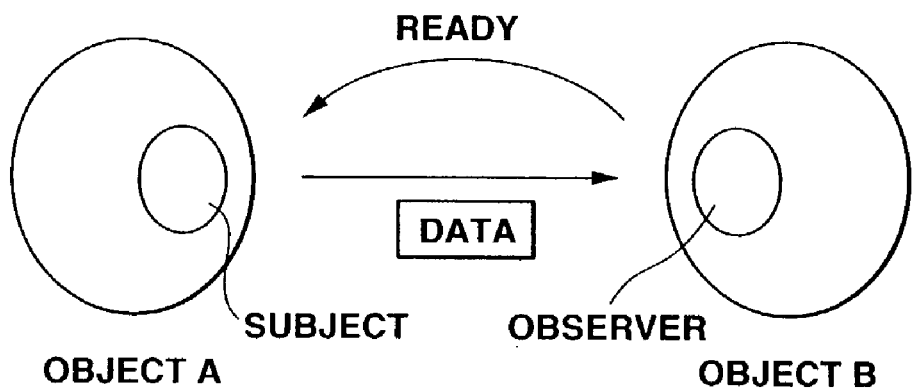
FIG. 12 is a diagram showing the relation between an observer and a subject.

FIG. 12 is a diagram showing the basic structure of inter-object communication between two objects in this embodiment. In this embodiment, the inter-object communication is carried out by using a Ready signal and a Notify signal, so that transmission of the data which exceeds the processing ability of the object (in this example, object B) is prevented.

In FIG. 12, an object A sends data from a subject of a class 0, which is a member of the object A, to a 0 observer class, which is a member of an object B, thus invoking the method of the object B. The subject and the observer referred to in this case constitute so-called surrogate programs in the objects to which they belong.

In such a relation, the subject sends data only when a Ready signal is being sent from the observer. A Ready signal must be sent once for each transmission of data. Thus, the object B on the observer side can wait for the completion of the processing of received data and then receive the subsequent data.

Figure 13:
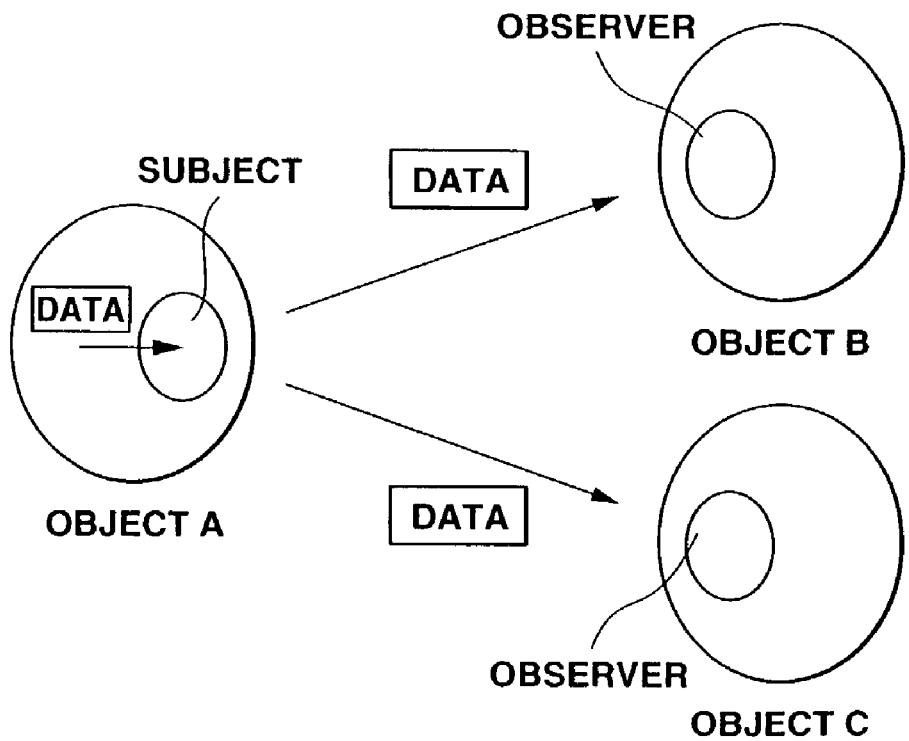
FIG. 13 is a diagram showing the relation between observers and a subject in a multi-observer environment.

FIG. 13 is a diagram showing the basic structure of inter-object communication in a multi-observer environment. In this case, an object A, which is a subject, can distribute data to all the observers and can also distribute data to a specific observer alone that is specified by the object ID. In this embodiment, again, data is sent to the corresponding observer in response to a Ready signal in such a multi-observer environment.

Each object designates the object ID specifying the object and the selector number (that is, method number) specifying the method, thereby starting (entry of) the corresponding method. Then, each object specifies an observer and sends desired data thereto.

Figure 14:
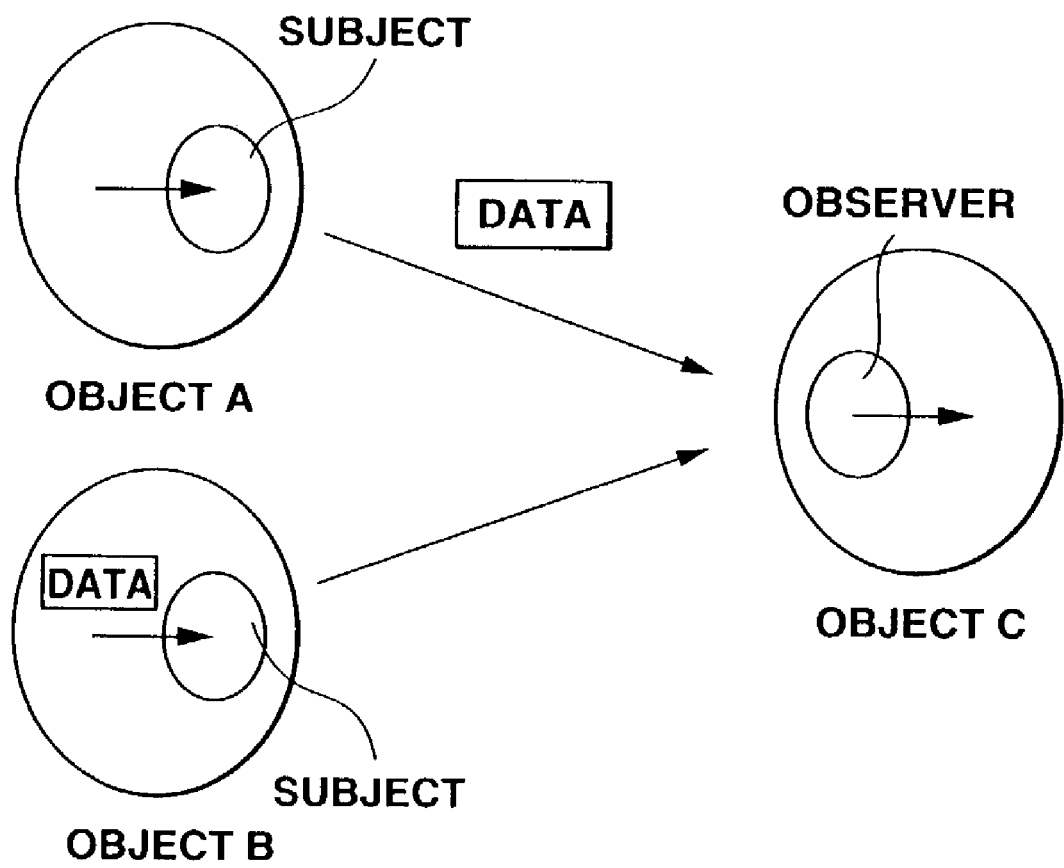
FIG. 14 is a diagram showing the relation between an observer and subjects in a multi-subject environment.

FIG. 14 is a diagram showing the basic structure of inter-object communication is a so-called multi-subject environment. In this case, objects A and B are subjects and an object C is an observer. The observer can receive data from a plurality of subjects, and has its method for processing data invoked every time data is received. Moreover, the observer can send a Ready signal only a specific subject specified by the subject ID and thus can selectively input desired data.

In this embodiment, at least an object belonging to the form-dependent software layer can carry out inter-object communication by using a Ready signal and a Notify signal as described with reference to FIGS. 12 to 14, and also can connect to another object in accordance with a multi-observer or multi-subject connection form, when necessary. That is, an object having a plurality of observers has connection entries of the number corresponding to the number of the plurality of observers.

Figure 15:
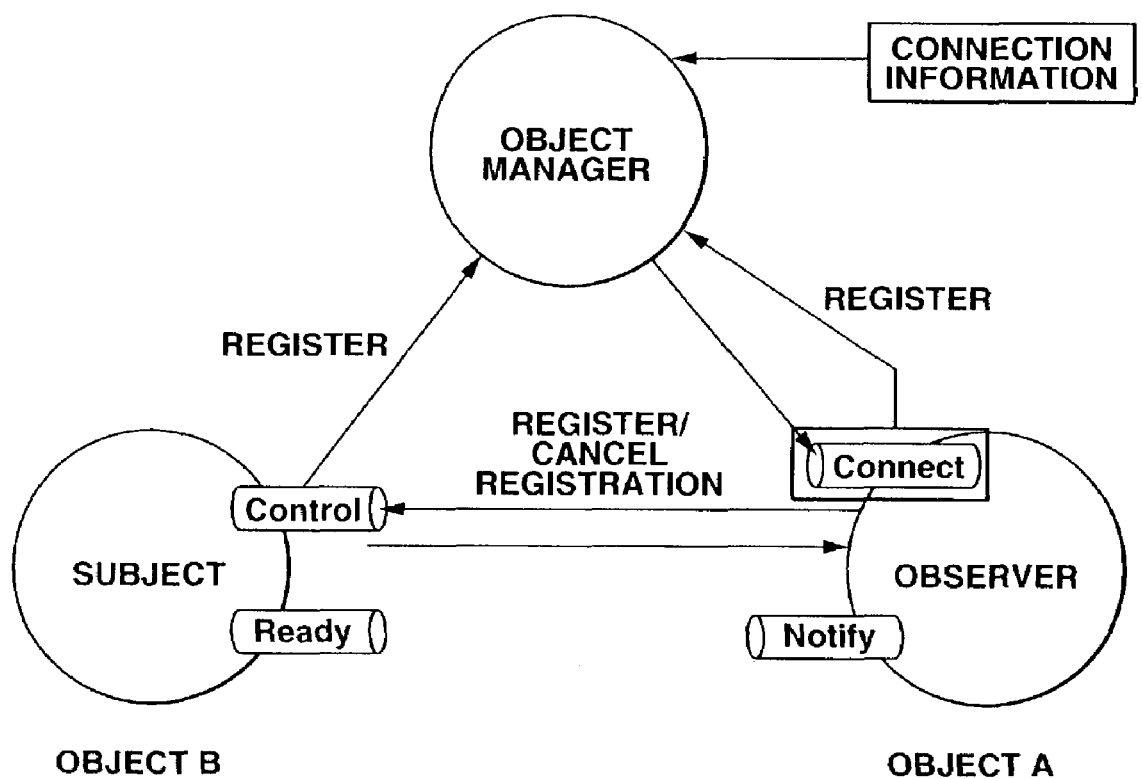
FIG. 15 is a diagram showing the relation between an object manager, an observer and a subject.

FIG. 15 is a diagram showing the relation between the object manager and respective objects. Each of the objects specifies a method in accordance with the object ID and the selector number and then exchanges data. Each of the objects has the selector numbers 0 to 3 allocated to the basic methods, irrespective of the corresponding subject and observer.

A do-initialize (DoInit) command is assigned to the selector number 0 and each object is initialized by starting this DoInit command. A DoStart command is assigned to the selector number 1 and each object is caused to start the operation by starting this DoStart command. A DoStop command is assigned to the selector number 2 and each object is caused to stop the operation by starting this DoStop command. A DoDestroy command is assigned to the selector number 3 and each object is caused to open the resource by this DoDestroy command.

Moreover, in response to these requests from the object manager or in response to a request from another object, each object properly sends the service name, the selector number and the like of the observer by using a return value.

Thus, after the objects are loaded or unloaded by the object manager on the basis of the connection information (connection data) sent from the design robot, the inter-object communication can be reconstructed.

The following formula represents the connection information (connection data) sent from the design robot. The service name of the subject and the service name of the observer are described in a text data format with a comma between them. On the subject side, the object name "FooB," the data format "Image," the corresponding constituent element name "RightCamera," and "S" indicating the subject are described as the service name. On the observer side, the object name "FooA," the data format "Image," the corresponding constituent element name "RightCamera," and "O" indicating the observer are described as the service name.

$$\text{FooB.Image.RightCamera.S,FooA.Image.RightCamera.O} \tag{5}$$

When loading an object, the object manager detects the object name of the object to be loaded from the description of this connection information (connection data).

Moreover, the object manager secures a stack memory and a heap memory and loads the object of the detected object name from a predetermined file. In this case, the object manager acquires the object ID from the operating system (OS) and records this object ID together with the object name described in the connection information (connection data).

Thus, the object manager executes the following DoInit, DoConnect, DoStart processing and the like by using the object ID registered in the above-described manner.

In the DoInit processing, on the basis of the acquired object ID and the above-described selector number, the object manager calls a DoInit command with respect to all the objects acquired by loading the objects. The objects have their respective internal variables initialized in accordance with the DoInit command, and the object manager thus initializes the respective objects.

In this initialization processing, the object manager registers an entry (Control) as a subject of each object and an entry (Connect) as an object in accordance with the notification from each object. The name of the object and the names of the subject and object are registered correspondingly to the description of the subject and object in the connection information (connection data).

In the DoConnect processing, on the basis of the registration in the DoInit processing, the object manager gives a notification of the subject ID (object ID) and the entry (Control) of the subject as a registration target, to the entry (Connect) of each object having an observer. The object, on receiving the notification, accesses the corresponding subject by using the subject ID and the entry (Control) provided in the notification, and the connection of an entry (Notify) is registered. A Ready signal is returned to the observer from the subject for which the connection registration is requested, and the observer and the corresponding subject are thus connected with each other.

In constructing the inter-object communication between the observer and the subject, the object manager gives a notification of the subject ID (object ID) and the entry (Control) of the corresponding subject, to the observer notified of in the connection information (connection data). Therefore, each object can develop any object as a connection target without explicitly showing it, and also can connect to various objects in accordance with instructions from the object manager, when necessary. Thus, higher independence can be secured than in the conventional technique.

In this case, as the object manager constructs the inter-object communication in accordance with the connection information (connection data), the form-dependent software is updated easily and freely, thus enabling easy change of the software in accordance with the form.

In the DoStart processing, the object manager sends a DoStart command to each object by using the above-described selector number 1. Each object, if it has an observer, sends a Ready signal to the subject by using the subject ID acquired by the DoConnect processing and an entry (Ready). Thus, the state in which data can be received from the corresponding subject is formed and the form-dependent software start the operation.

That is, the subject in the multi-observer environment gives a notification of data, for example, a sensor output, to the observer which is sending a Ready signal, of the registered observers. The observer completes the processing of the received data and sends a Ready signal when it can receive the next data.

In the above-described cases of shutdown, plug-in, plug-out, and state change, the connection information (connection data) sent from the design robot differs from the contents which were previously sent and registered from the design robot. Therefore, the object manager sends a DoStop command to each object by using the above-described selector number 2. In this case, the observer cancels the entry (Ready).

In the DoDisconnect processing, the object manager shuts down the communication connection between the subject and the observer. In this case, the object manager sends a DoDisconnect message to the entry (Connect) of the observer, then causes the observer to issue a disconnection request (Remove Observer) of the entry (Control) to the subject, and thus shuts down the communication connection.

In the DoDestroy processing, the object manager sends a DoDestroy command to the corresponding object by using the above-described selector number 3 and thus destroys the object. In this case, the object cancels the registration which was carried out in the DoInit processing.

In the Object Unload processing, the object manager opens the areas of the stack memory and the heap memory with respect to the object destroyed by the DoDestroy processing and unloads this object. The object manager also deletes the subject ID and the subject name which were registered at the time of loading.

Figure 16:
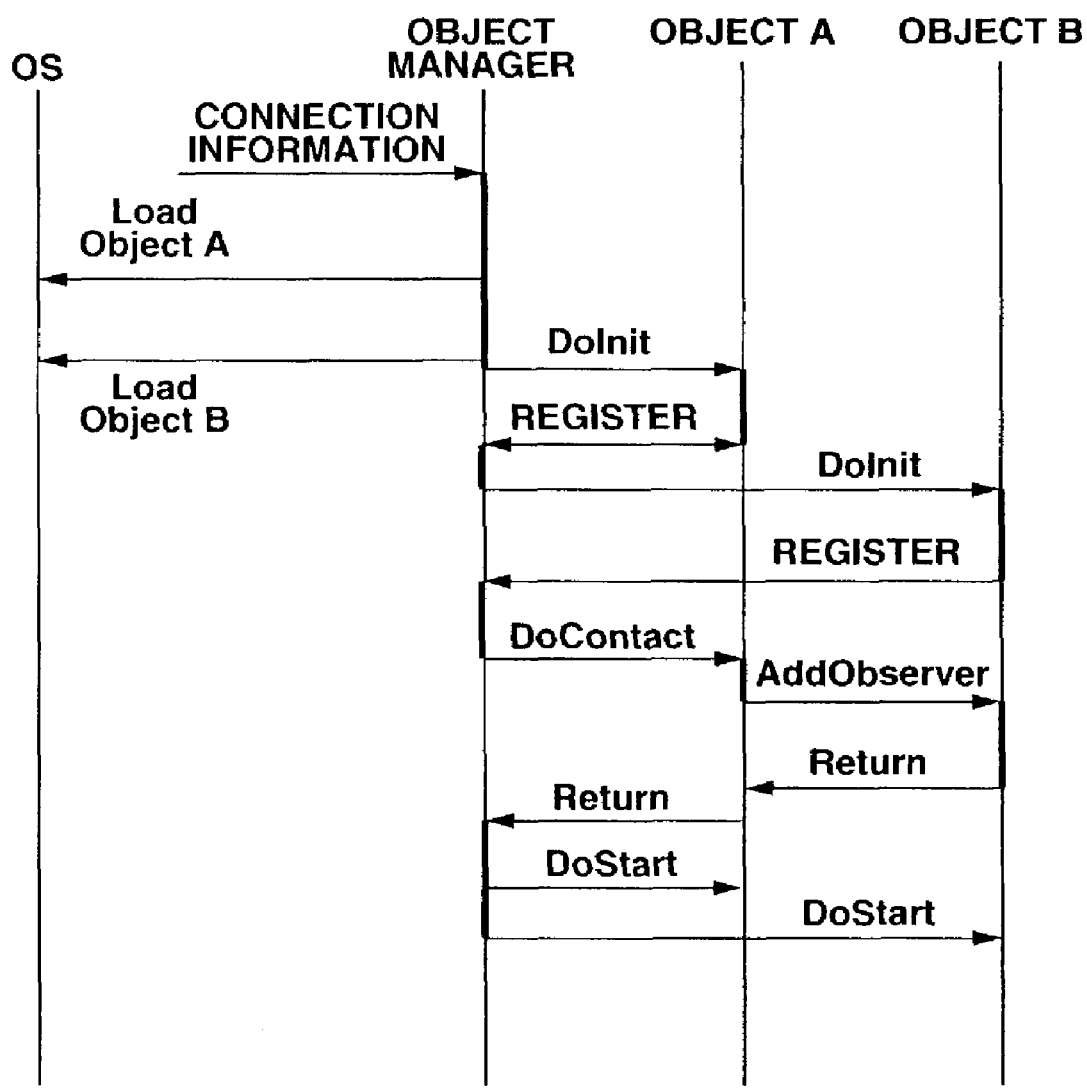
FIG. 16 is a time chart showing the operation of an object manager in the case where connection information is received.

For example, on receiving the connection information (connection data) from the design robot, the object manager controls up to the DoStart processing by using the above-described control processing in accordance with a sequence shown in FIG. 16.

Specifically, when the connection information (connection data) is sent to the object manager by a message, the object manager is started up and loads the object A and the object B described in this connection information. In this case, the object manager loads the object A and the object B in accordance with a system command of the operating system. At this point, the object manager acquires and registers the object IDs of the objects A and B.

Then, the object manager starts the DoInit processing of the objects A and B in accordance with the observer ID acquired as described above and the selector number 0, and thus acquires and registers an entry (Control) as a subject and an entry (Connect) as an object from the objects A and B.

Subsequently, the object manager starts the DoConnect processing of the object A, which is an observer, by using the registered entry (Connect), and connects the object B, which is a subject, to the object A. The inter-object connection is thus constructed on the basis of the connection information (connection data) and the object manager starts the DoStart processing of the objects A and B.

Figure 17:
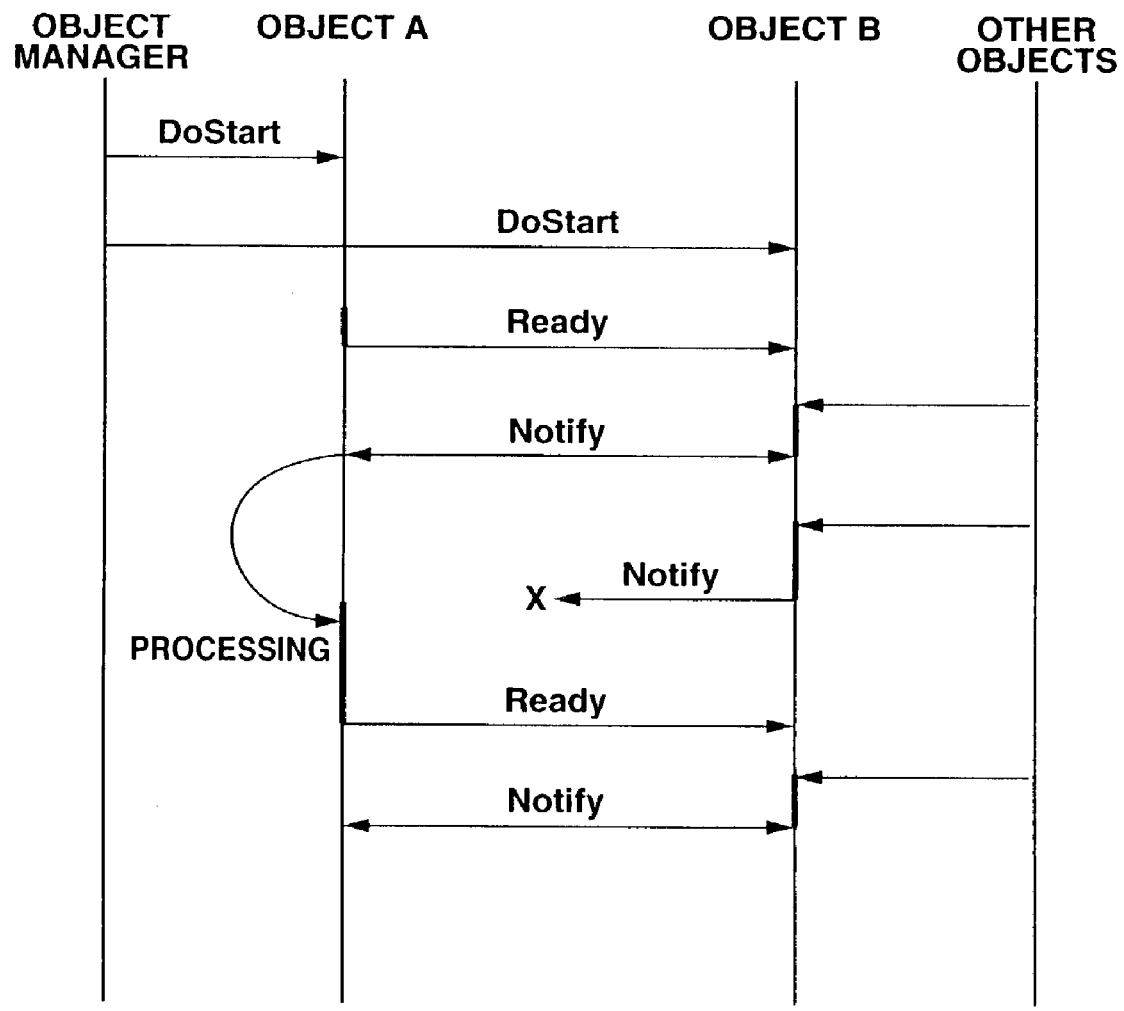
FIG. 17 is a time chart showing the sequence after DoStart.

FIG. 17 is a time chart showing the sequence after the DoStart processing. When the object A, the object B and other objects are started up by the DoStart processing at the object manager, these objects carry out the inter-object communications using the above-described Ready and Notify messages.

In this case, the start-up causes the object A to send a Ready message to a Ready entry of the object B, and a Notify entry of the object A by the object B causes data to be sent to the object A from the object B. If no message is sent to the Ready entry of the object B from the object A during the processing of this data, the Notify entry of the object A by the object B is registered and a Ready entry of the object B by the object A causes data to be sent. Thus, in this inter-object communication, transmission of data which exceeds the data processing ability of the object A is prevented.

Figure 18:
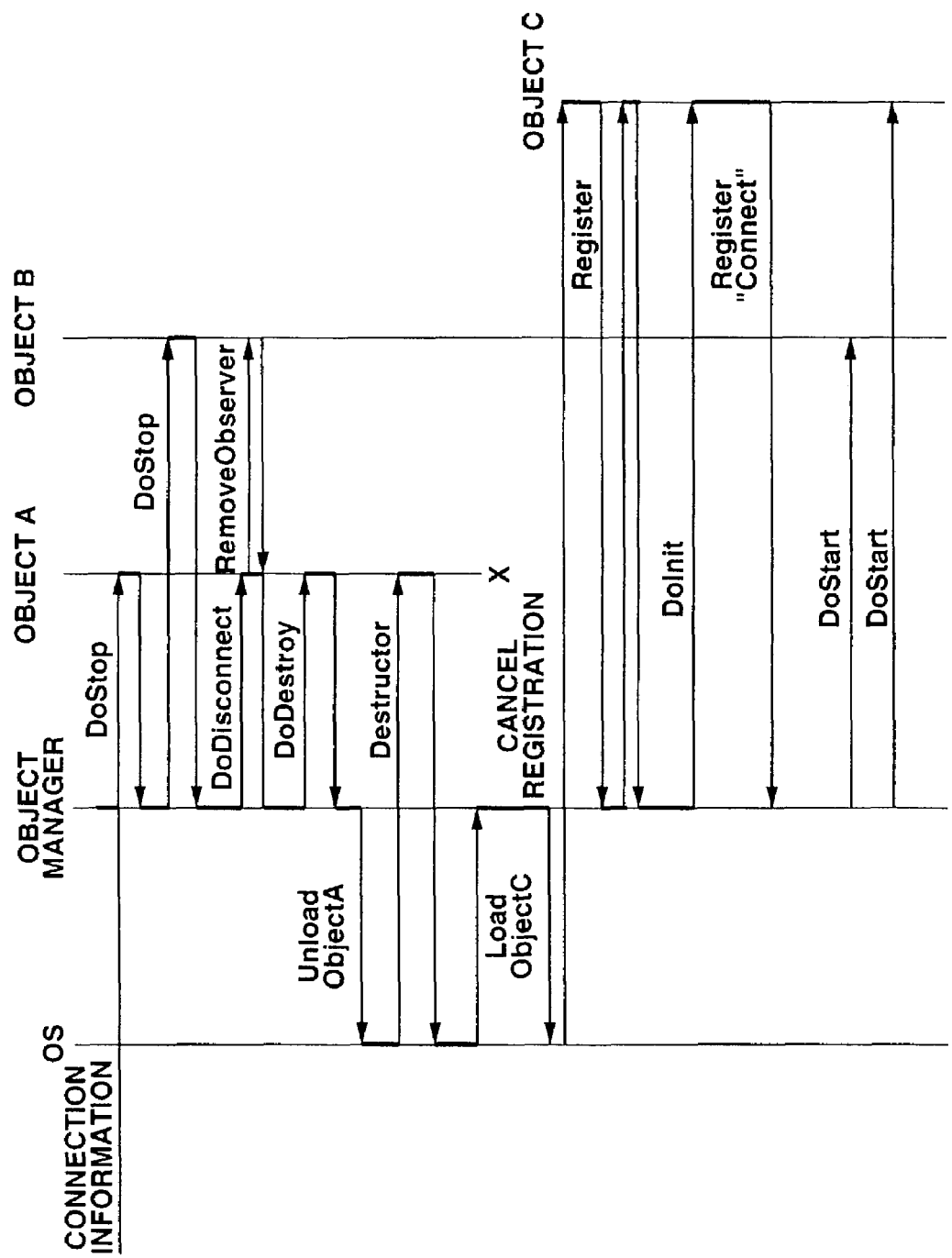
FIG. 18 is a time chart showing the sequence at Plug-In, Plug-Out, and state change.

FIG. 18 is a time chart showing the sequence at plug-in, plug-out, and state change. When the connection information (connection data) sent from the design robot differs from the contents which were previously sent and registered from the design robot, the object manager sends a DoStop command to all the objects to stop the operations of all the objects. In this case, the objects A and B cancel the Ready entries so that their respective Notify entries will not be started thereafter.

On completion of the DoStop processing of all the objects, the object manager in this case sends a DoDisconnect command to the object A to disconnect the object A from the other objects and then starts the DoDestroy processing of the object A. The resource of the object A is thus opened and the registration of the object B carried out by the DoInit processing is canceled.

When the DoDestroy processing of the required object(s) is completed, the object manager executes the unloading in accordance with a system command of the operating system. The destructor of the required object is accessed, that is, in this case, the destructor of the object A is accessed, thereby canceling the registration of the object A carried out at the time of loading. Moreover, the object manager opens the stack memory and the heap memory and thus completes the unloading of the object A.

Then, the object manager gives an instruction to load the object C in accordance with the connection information (connection data), and sequentially starts the DoInit, DoConnect and DoStart processing similarly to the processing described above with reference to FIG. 16. Thus, during the operation, the structure constituted by the objects A and B is changed to the structure constituted by the objects B and C without compiling.

The inter-object communication and the like are described above with reference to FIGS. 12 to 18. Hereinafter, a network system related to the present invention will be described, which is an essential part of the embodiment. The network system to which the present invention is applied enables change or the like of the software of the robot apparatus connected to a remote system (for example, a system using a personal computer as a terminal) on the network, and assumes that the robot apparatus 1 is connected to the remote system.

Figure 19:
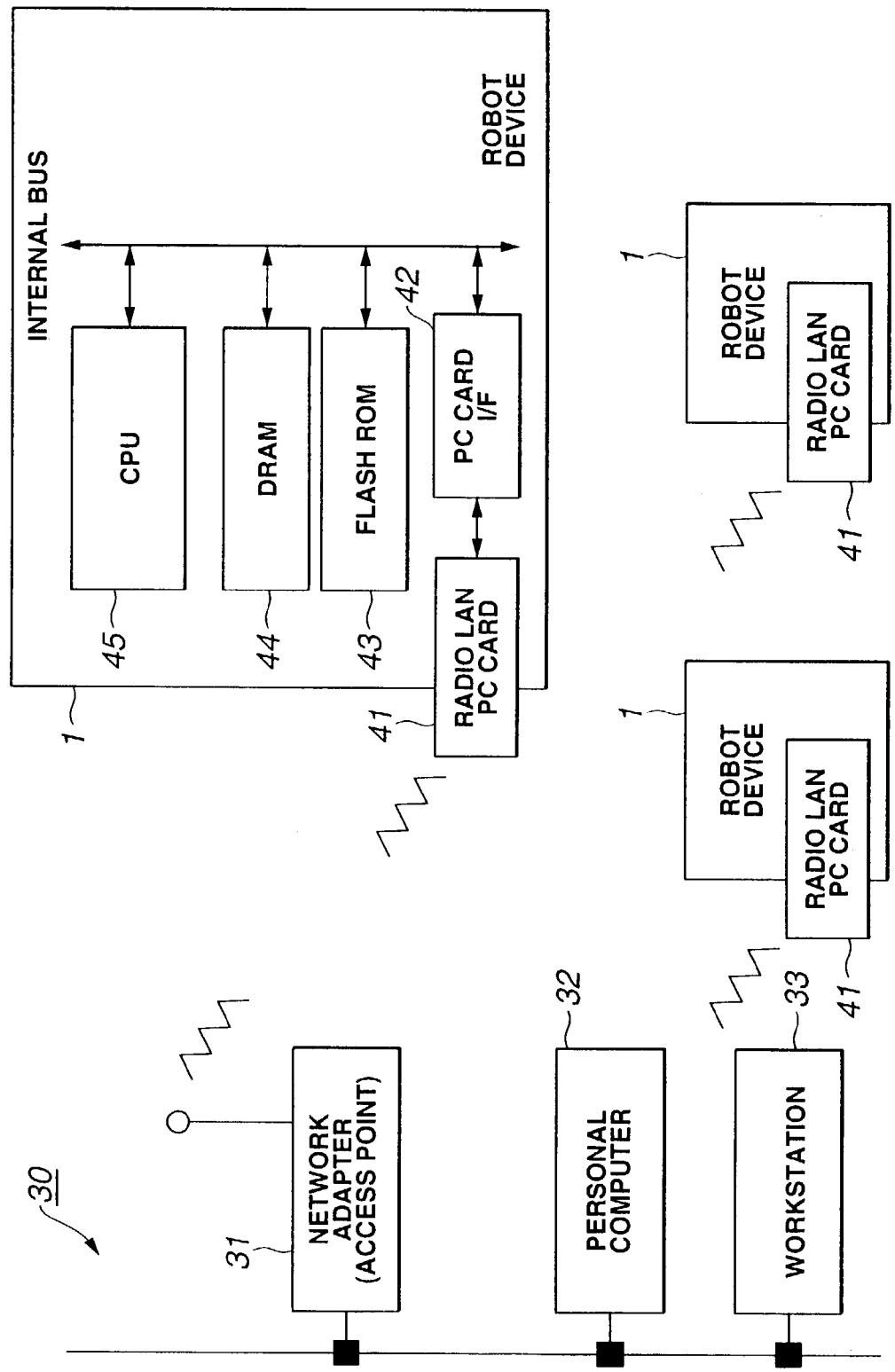
FIG. 19 is a block diagram showing the structure of a network system of an embodiment.

FIG. 19 shows an exemplary structure of the network system to which the present invention is applied. In this network system, a remote system 30 is a system having a personal computer 32 and a workstation 33 as terminals, and the robot apparatus 1 is a robot apparatus having communication means to the network. The robot apparatus 1 has a radio LAN PC card 41, and the remote system 30 has a network adapter 31 for communicating with the robot apparatus 1. In the network system, the TCP/IP (Transmission Control Protocol/ Internet Protocol) is employed, which is a protocol for network communication, so as to carry out the communication between the remote system 30 and the robot apparatus 1. Thus, the robot apparatus 1 is provided with an IP address and therefore can communicate with the personal computer 32 in the network system. As the network system is thus constructed to enable communication with the robot apparatus 1, the robot apparatus 1 is handled as a machine (electronic equipment) on the radio LAN (local area network).

The robot apparatus 1 has at least a PC card I/F 42, a flash ROM 43, a DRAM 44 and a CPU 45, for example, as shown in FIG. 19. The PC card I/F 42 is an interface for the radio LAN PC card 41. The flash ROM 43 and the DRAM 44 are storage means for storing various information handled by the robot apparatus 1. The CPU 45 is control means for controlling each part of the robot apparatus 1. For example, the CPU 45 corresponds to the central processing unit 22 shown in FIG. 2. FIG. 19 shows three robot apparatuss 1, each of which has such a structure.

As will be later described in detail, this network enables the development side of the robot apparatus 1 to develop objects held by the robot apparatus 1 while the robot apparatus 1 is connected to the network. The network also enables the user side to monitor the internal state of the robot apparatus 1 on the network by using the personal computer 32 or the like.

In the above-described example, the robot apparatus 1 is connected to the network system by using a radio LAN. This is because no physical connection is desired for such a moving computer as the robot apparatus 1. Therefore, the communication is not limited to radio communication. For example, the robot apparatus 1 and the personal computer 32 can communicate with each other via wired communication.

Figure 20:
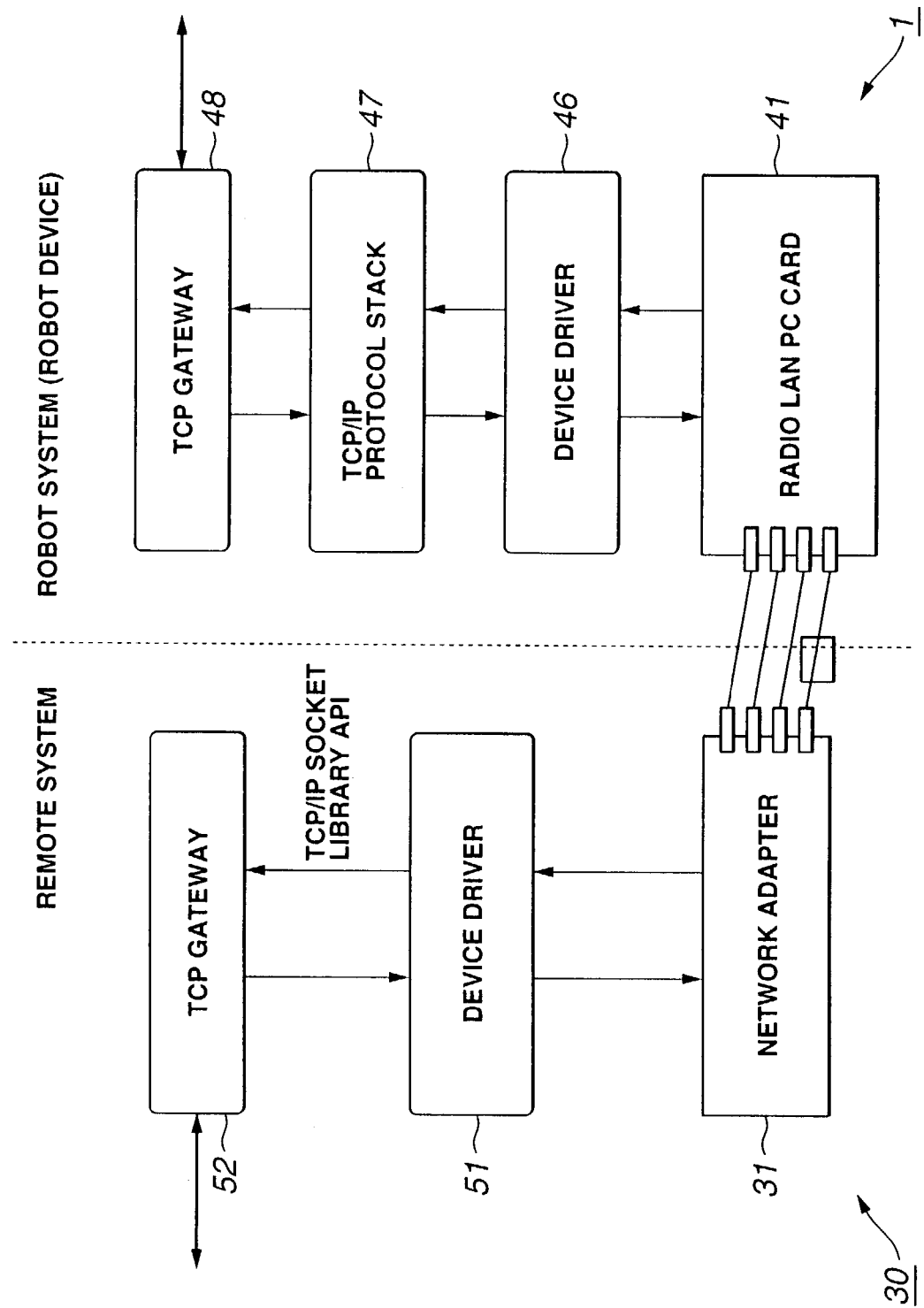
FIG. 20 is a block diagram showing the structure of essential parts of a robot apparatus and a remote system constituting the network system of the embodiment.

FIG. 20 shows an exemplary structure of the robot apparatus 1 and the remote system 30 which can communicate with each other in the network system as described above.

The robot apparatus 1 has the radio LAN PC card 41, a device driver 46, a TCP/IP protocol stack 47 and a TCP gateway 48 as communication parts. The remote system 30 has the network adapter 31, a device driver 51 and a TCP gateway 52 as communication parts.

Both the robot apparatus 1 and the remote system 30 have the adapters for network on their respective lowermost layers. The radio LAN PC card 41 as hardware in the robot apparatus 1 and the network adapter 31 in the remote system 30 constitute these adapters for network.

The radio LAN PC card 41 (for example, including the PC card I/F) of the robot apparatus 1, which is referred to as a first electronic equipment, is first communication means having (allocated thereto) an information processing process (gateway object 48) for transmitting and receiving data to and from an information processing process (object) of the robot apparatus 1. The network adapter 31 connected to the personal computer 32 (remote system 30), which is referred to as a second electronic equipment, is second communication means having (allocated thereto) an information processing process (gateway object 52) for transmitting and receiving data to and from an information processing process (object) on the personal computer 32. In the network system, when the radio LAN PC card 41 and the network adapter 31 are connected with each other via radio or wired connection, inter-process communication (inter-object communication) is carried out between the information processing process (gateway object 48) for transmitting and receiving data of the radio LAN PC card 41 and the information processing process (gateway object 52) for transmitting and receiving data of the network adapter 31, thereby carrying out inter-process communication (inter-object communication) between the information processing process of the robot apparatus 1 and the information processing process of the personal computer 32.

Moreover, data communication using the TCP/IP data communication system, which is often used for network communication, is carried out between the information processing process for transmitting and receiving data of the radio LAN PC card 31 and the information processing process for transmitting and receiving data of the personal computer 32.

The robot apparatus 1 and the remote system 30 have the devices drivers 46 and 51, respectively, on the upper layers than the radio LAN PC card 41 and the network adapter 31.

The device drivers 46 and 51 are software for controlling the radio LAN PC card 41 and the network adapter 31 as the adapters for each network.

The robot apparatus 1 and the remote system 30 also have TCP/IP socket interfaces, not shown, on the upper layers than the device drivers 46 and 51, respectively. The robot apparatus 1 and the remote system 30 input and output data via their respective TCP/IP socket interfaces. For example, the robot apparatus 1 has a protocol stack object which is equivalent to a socket library, and uses this protocol stack object for access.

In the robot apparatus 1 and the remote system 30, the gateway objects (TCP gateways) 48 and 52 are arranged on the upper layers than the TCP/IP socket interfaces, not shown. The gateway objects 48 and 52 constitute inlets/outlets with respect to the network. The gateway objects 48 and 52 carry out conversion between the protocol for the above-described inter-object communication and the TCP/IP protocol, which is the protocol for network communication.

Of the two gateway objects 48, 52 in the respective systems, one gateway object plays the role of a server (hereinafter referred to as server gateway object) and the other gateway object plays the role of a client (hereinafter referred to as client gateway object). For example, in consideration of the nature of the systems, the gateway object on the side of the remote system which mediates the procedure with the user becomes the client gateway object, and the gateway object of the target system (robot apparatus) becomes the server gateway object. The specific operations of the gateway objects 48 and 52 will now be described.

The gateway objects 48 and 52 have a setting file called port.cfg file in which the setting of the communication system is described, and uses the setting file to make correspondence of the communication service name defined in the inter-object communication to the IP address and the port number used in TCP/IP communication.

FIG. 21 shows an example of the port.cfg file (setting file). For example, various information is described as a text data format in the port.cfg file. Specifically, the object name, data name, subject name, port number, IP address and the like are described. This port.cfg file can be freely rewritten.

Since the gateway objects 48 and 52 have the relations with the object A and the object B as shown in FIG. 12 or FIG. 15, the gateway objects 48 and 52 can carry out predetermined processing along a predetermined sequence. Specifically, the gateway objects 48 and 52 dynamically generate an observer and a subject, which are surrogate programs, and associate the service names described in their respective port.cfg files with the observer or subject ID, thus carrying out registration to the service managers (object managers) on their respective systems.

Since the service names can be freely described into the port.cfg files, as described above, the gateway objects 48 and 52 execute all the services which are thus freely described in the port.cfg files. By eliminating the limitation to the description of the service name to the port.cfg files, inter-object communication between all the objects (the object of the robot apparatus 1 and the object of the personal computer 32) can be carried out via the gateway objects 48 and 52.

The service name corresponds to the observer or subject ID and the port number, in order to correspond to the network port (IP address and port number) described in the port.cfg file. By making the correspondence of the description of the port.cfg files, that is, allocating the same port number to the service name of the corresponding inter-object communication, in the gateway objects existing in different places on the network, the correspondence of the inter-object communication between the gateway object 48 of the robot apparatus 1 and the gateway object 52 of the remote system 30 is made on the network.

If a connection request is sent to the observer or subject in the client gateway object 52 of the remote system 30, connection (connect command) is carried out to the corresponding port number. If the server gateway object 48 on the target system (target board or robot apparatus 1) side has been already started up, the connection will be established. On the other hand, if the target system is not ready, reconnection is made after a few seconds and the connection is established after the target system becomes ready.

After the connection is established, every time the observer or subject of the gateway object receives data (Notify or Ready message), the message is sent into the corresponding port. On the contrary, when the network port receives data, the corresponding observer sends out a Notify message and the subject sends out a Ready message.

Figure 22:
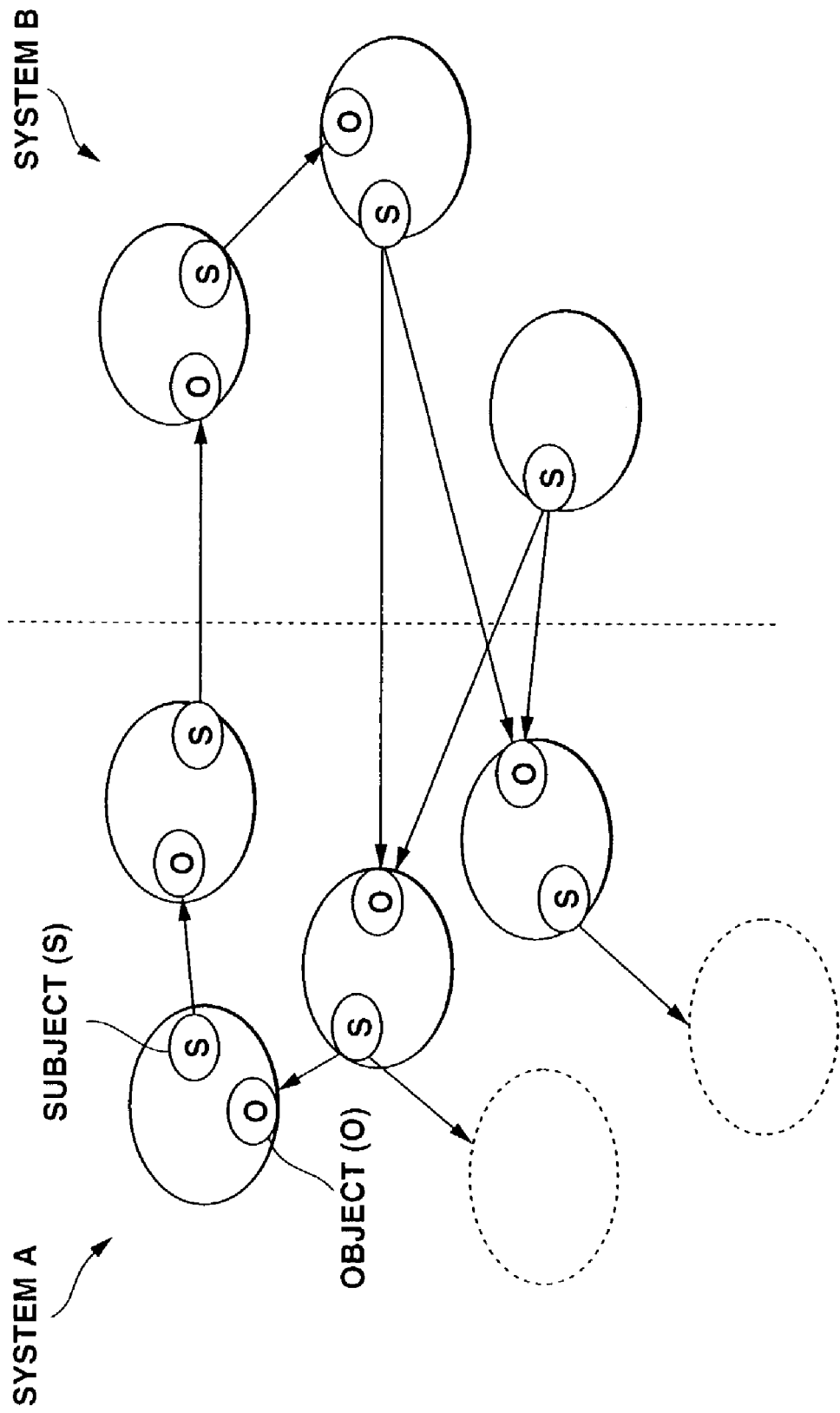
FIG. 22 is a view showing the state of a group of objects before connection.
Figure 23:
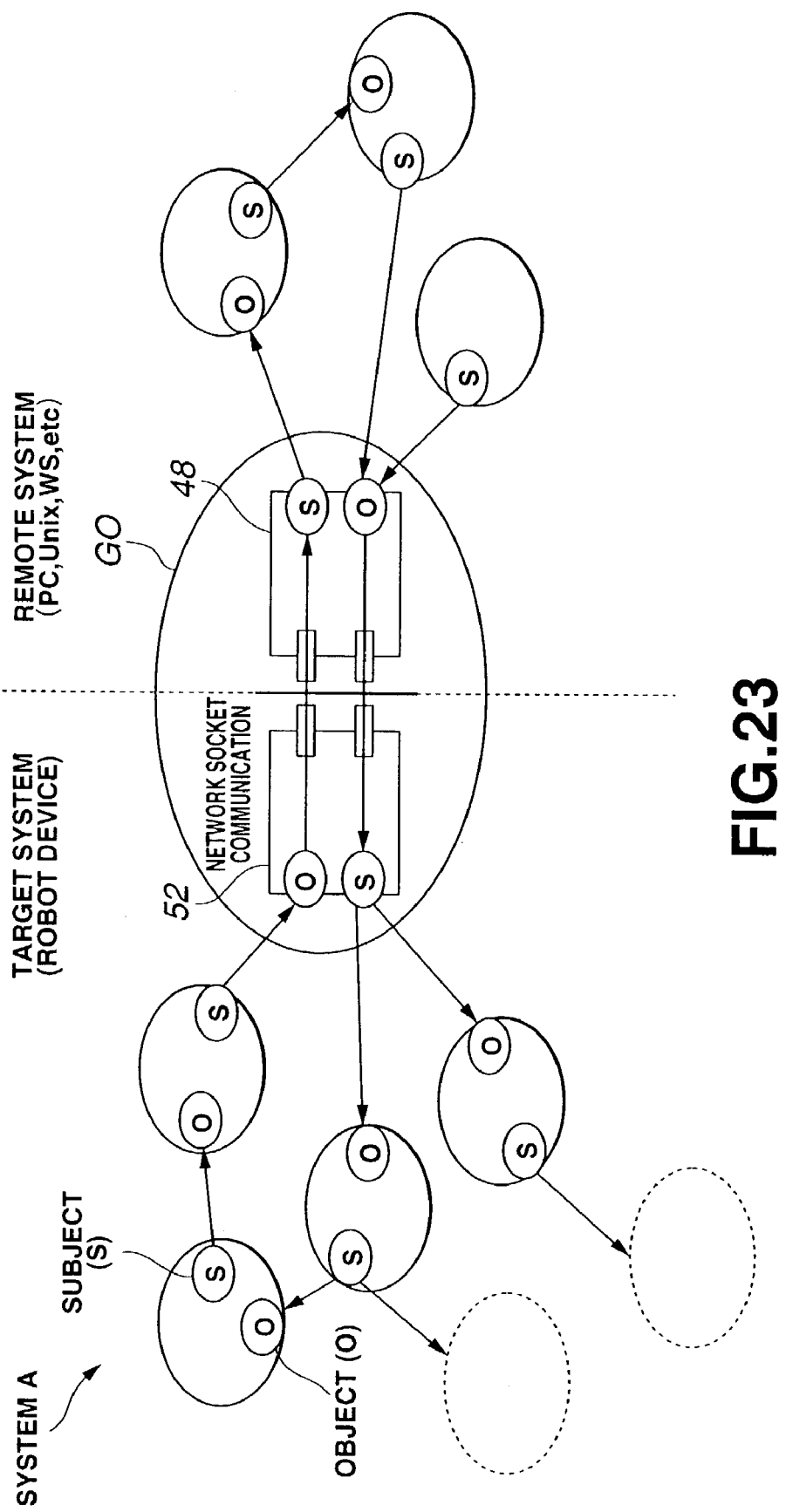
FIG. 23 is a view showing a group of objects connected by a gateway object.

As the connection is established between the systems as described above (that is, between the robot apparatus 1 and the remote system 30), the robot apparatus 1 and the remote system 30 connected with each other by the network can be handled as one system including a plurality of objects. For example, as shown in FIG. 22, a system A (for example, robot apparatus 1) including a group of objects (for example, part of software) and a system B (for example, remote system 30) including another group of objects (for example, part of software) are independently constructed on the opposite sides of a boundary indicated by a dotted line in FIG. 22 before the connection is established. After the connection is established, the communication over the boundary indicated by the dotted line is eliminated, and a virtual gateway object GO as shown in FIG. 23 (for example, a set of gateway objects 48, 52) is provided. This is considered as being equivalent to connecting the object groups of the respective systems with each other. Thus, it is understood that the objects of the robot apparatus 1 and the objects of the remote system 30 constitute one system. The robot apparatus 1 is operated by the remote system 30 over the network via the single virtual gateway object GO.

The systems (robot apparatus 1 and remote system 30) are thus connected with each other by the virtual gateway object GO and all the transmission/reception of data as shown in FIG. 20 is carried out. Therefore, the objects connected to the gateway objects of the respective systems (robot apparatus 1 and remote system 30) can carry out inter-object communication with the objects existing on the other system without being aware of the communication over the network.

Since the change from the network structure as shown in FIG. 22 to the network structure as shown in FIG. 23 can be handled as being equivalent to a change of connection between objects, the network structure as shown in FIG. 23 can be realized simply by changing the description of the connection file for connecting desired objects with each other, without additionally changing the object code.

Even when the same code cannot be executed by the remote system 30 and the target system (robot apparatus 1) because of the difference in the OS or processor, the above-described framework of inter-object communication is independent of the OS or processor and therefore an object which can be executed on the executing system can be generated by re-compiling based on the framework implemented on the executing system.

Such a network system enables change, on the remote system 30, of an object on the remote system 30 connected (communicating) with an object on the target system (robot apparatus 1). Thus, an object can be developed (designed) on the remote system 30 in consideration of the actual state (real environment) of the target system or in real time.

After the development, the object developed on the remote system 30 is re-compiled and introduced to the robot apparatus 1. Since the object introduced to the robot apparatus 1 is developed in consideration of the state (real environment) in which it is mounted on the robot apparatus 1, the object causes no problem and carries out processing on the robot apparatus 1 without generating any inconvenience with respect to the other objects. Moreover, the development of an object is easy because it is realized simply by the virtual connection of the gateway objects.

With respect to the above description, a network extension technique conforming to a predetermined standard, for example, OPEN-R, which is a platform technique for hardware and software for an entertainment robot proposed by Sony Corporation, will now be described. In this platform technique, software is constituted as a component and is executed as a unit of object (equivalent to a process).

A communications protocol is provided between objects designed on the basis of the observer pattern of the design pattern in the object-oriented system, and the user needs to define the data structure of data to be inputted to the object and its service name, the method for processing the data, and the output data structure and its service name. By connecting the object for which the data structures, the service names and the processing method are defined, an event is propagated and a series of systems of the robot from recognition to action are realized.

The inter-object communication has the following characteristics:

in designing the object, only data to be received and data to be transmitted are defined, and the transmission source and destination of a message are not defined;

a port for transmission/reception is referred to as service, and each port is given a unique name defined by the user;

the transmission and reception of a message is carried out by surrogate classes called O Subject and O Observer, and the instances thereof correspond to the above-described individual services on the one-to-one basis;

the connection between the services is defined in a connection file and is sent to the instances of O Subject and O Observer at the start-up of the system;

the communication between the services is asynchronous communication and the connection supports multiple-to-multiple communication;

the flow control of data is carried out by using a Ready message, which indicates that reception is possible; and a shared memory is used in order to secure the scalability of data and realize a higher speed of transmission/reception.

The gateway object will now be described. The movement of the radio network in the robot is not limited and therefore is very useful. Various usages may be considered such as sending sensor information of the robot, sending the result of processing, and moving the robot by using a tool on a remote host. Although there is known an approach to provide a framework which conceals accesses to distributed objects on the network from the proxy on the client side so that the client side is unaware of the accesses, such an approach is inefficient for development because an object for communication must be designed or a communication code must be added to the existing objets and the proxy, every time a new service is provided. Since the software inside the robot is described on the basis of the programming framework of the predetermined platform technique, the dependent relation of the definition of data, the communication method and the communication partner, between the objects, is totally separated. Thus, as described with reference to FIGS. 20 and 21, an object called TCP gateway equivalent to the outlet/inlet of the network is introduced. This object (TCP gateway) reads the setting file (FIG. 21) in which the correspondence of the service name of the inter-object communication to the TCP/IP port number is described, and this object dynamically generates a service and port and carries out protocol conversion of data which is sent there (FIG. 20). By connecting the service to the predetermined data port, the communication partner can be selected. Since the communication method and the communication partner are thus determined by using the TCP gateway, the designer of the object may decide the definition of data only and can easily use the network.

The framework of the above-described predetermined platform technique can be implemented on an OS other than the OS currently used on the robot, by using Fork( ), exec( ) of Unix and a function equivalent to the message communication of IPC and shared memory, that is, W. Richard Stevens, "Unix network programming, second edition, Vol.2, IPC: inter-process communication," Pearson Education, 2000. In a ready environment prepared on Linux, an object is compatible with the code inside the robot at the source code level and therefore a code which is executable in both systems can be described.

As the above-described TCP gateway objects are similarly implemented in this emulation environment and the port numbers of the respective TCP gateways are matched, the two systems can be symmetrically connected with each other, as shown in FIG. 23. Thus, the objects in the robot and the objects on the remote host can communicate with each other in real time. The development side for the objects of the remote host can freely use sensor information on the robot and commands to operate the robot while using a convenient tool, for example, on Linux. By actually carrying out complicated image recognition on the remote host and then operating the robot in accordance with the result of the image recognition, or by re-compiling an object on an upper layer of a commercially available pet program and executing the object on the remote host while communicating with the robot, it is confirmed that this technique is not inferior to a stand-alone system in terms of the real-time operability.

Of course, the software development on a general-purpose computer such as Linux is overwhelmingly more efficient than the software development on an embedded equipment. Moreover, with respect to popularization, it is very advantageous to enable programming for a robot in a development environment which is used all over the world.

It is also possible to ultimately re-compile the thus developed code in a development environment for embedding and make a commercial package as software for a stand-alone system.

The application of the technique to a multi-CPU robot will now be described. The mechanism of the extension of inter-object communication as described above can also be applied to a robot system having two or more CPUs for embedding. At present, two CPUs can communicate with each other via a so-called OPEN-R bus of the above-described predetermined platform technique for robot. By introducing a protocol conversion object of this bus communication, the communication between an object group for motion control in the one CPU and a thinking-type object group in the other CPU can be freely defined.

As is described above, data transmitted in inter-object communication is made usable from the network by introducing the TCP object, and the programming framework of the above-described predetermined platform technique for robot is realized on a general-purpose computer such as Unix or Linux. Moreover, the portability of the architecture of the platform technique can be presented, and construction of an environment for seamless execution and development of an object between the robot and the remote host is made possible by combining the gateway and the emulator.

Figure 24:
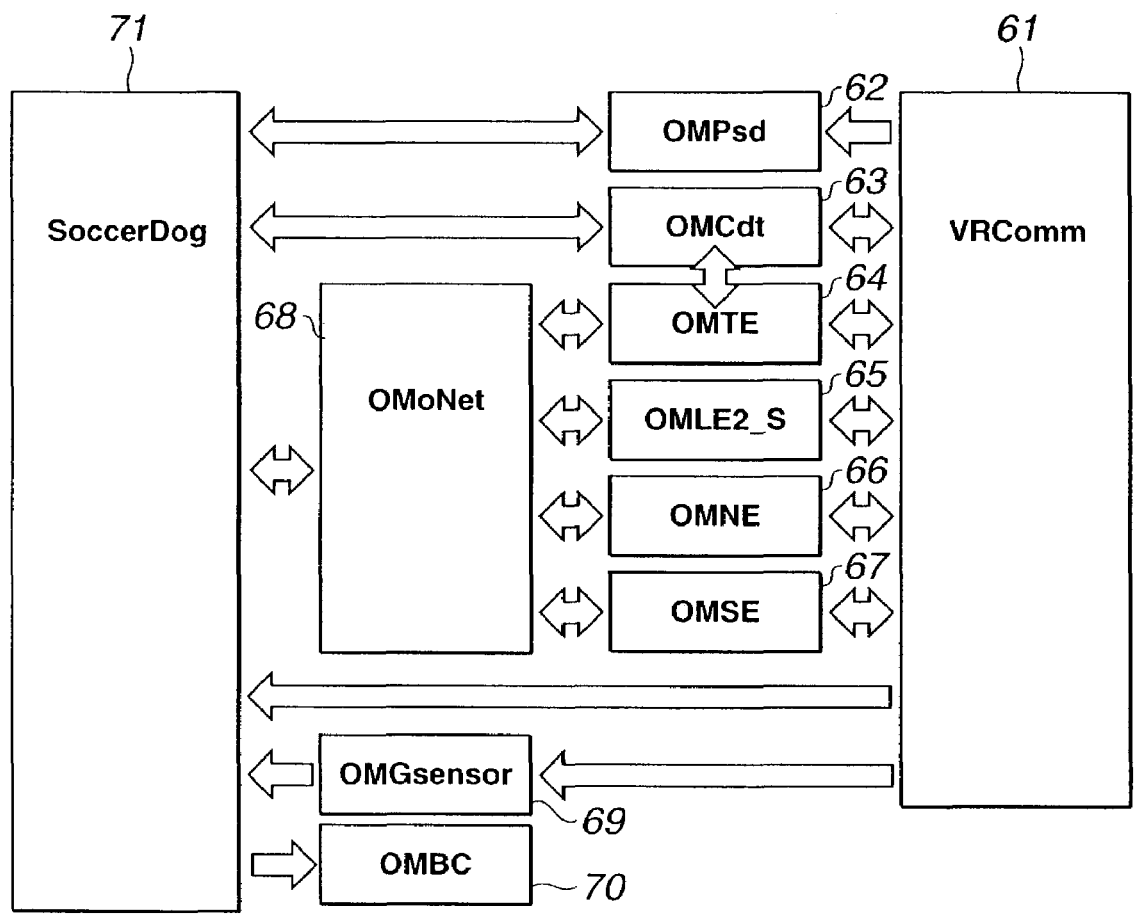
FIG. 24 is a block diagram showing a group of objects including a SoccerDog object constituting the software of the robot apparatus.

A specific example of the network system using the gateway object will now be described. FIG. 24 shows an exemplary structure of robot software (software including a plurality of object groups) for executing a so-called soccer dog on the basis of the above-described framework for inter-object communication.

A program for soccer dog is a program which causes the robot apparatus to execute an action of searching for a ball and then approaching and kicking the ball, like a soccer player. The soccer dog program has the description for executing such actions and a software component (object) necessary for executing a task is selected on the basis of the description. If necessary, the whole system is newly constructed.

The outline of the function of each object shown in FIG. 24 will be described as follows. VRComm 61 is an object for accessing various devices of the robot apparatus 1. OMPsd 62 is an object for processing the information of a distance sensor. OMCdt 63 is an object for calculating the position of a ball on the basis of color detection. OMTE 64 is an object for managing the posture of the neck to control the eyes toward the ball. OMLE2_S 65 is an object for controlling the walking motion. OMNE 66 is an object for controlling the recovery from falling. OMSE 67 is an object for controlling the tail. OMoNET 68 is an object for carrying out exclusive control and posture information management between the motion control objects. OMGsensor 69 is an object for detecting the posture of the body of the robot apparatus. OMBC 70 is an object for managing battery information. SoccerDog 71 is an object for planning actions in soccer. The connection of these objects is realized by a connection file for each object connection described as shown in FIGS. 25 to 27. The connection file shown in FIGS. 25 to 27 are divided for convenience with respect to the sheet space, and the description is actually continuous in the order of FIG. 25, FIG. 26 and FIG. 27.

The case of newly developing the SoccerDog object 70 in the existing object group of such a structure (the case of software development environment) will now be described. As the following processing is carried out, the SoccerDog object 70 is newly developed.

Only the SoccerDog object 70 is taken onto the remote system 30, with all the other existing objects left on the robot apparatus 1.

On the side of the robot apparatus 1, a gateway object (TCP gateway object 48 shown in FIG. 20) is arranged in place of the SoccerDog object, and all the services to be connected to the SoccerDog object are connected to this gateway object. On the other hand, on the side of the remote system 30, a gateway object (TCP gateway object 52 shown in FIG. 20) is introduced in place of the existing objects, and all the connections to the SoccerDog object are made to this gateway object.

As such connections are made, connection from the remote system 30 using the gateway object on the robot apparatus 1 as a server is made possible at any time. Thus, the whole system can be caused to operate by booting up the system on the robot apparatus 1 and executing (starting) the SoccerDog object after compiling. An environment is set in which the development of the SoccerDog object is possible on the remote system 30. That is, inter-object communication is constructed between the SoccerDog object on the remote system 30 (personal computer 32) and the objects on the robot apparatus 1.

The development of the SoccerDog object on the remote system 30 is carried out, for example, by stopping the SoccerDog object if there is a certain trouble in the SoccerDog object, and then correcting again, compiling and executing the SoccerDog object on the remote system 30. For example, the trouble in the SoccerDog object may be such a case that in developing a new operation (for example, a new operation for an action of kicking a ball) by using the SoccerDog object, the robot apparatus 1 cannot normally execute such a new operation. In such a case, the SoccerDog object is stopped, corrected, re-compiled and executed again on the remote system 30.

After the trouble is adjusted and the development finally ends, the source code of the SoccerDog object on the remote system 30 is re-compiled for the environment of the target system (robot apparatus 1) and is linked with the existing objects, thus preparing an execution program for the robot apparatus 1. The execution program is introduced to the robot apparatus 1. The robot apparatus 1 has its operation controlled by the execution program thus introduced thereto.

In the above-described manner, the robot software for executing the soccer dog is developed by the network system according to the present invention.

Since the software (SoccerDog object) is developed on the remote system 30 in the state where with the remote system 30 and the robot apparatus 1 are connected with each other, it is not necessary to boot up again the whole system on the robot apparatus 1 and the SoccerDog object can be corrected (or processed). Thus, the SoccerDog object can be developed efficiently.

Since the software is developed without requiring downloading of the program to the robot apparatus 1, the development can be efficiently carried out. On the remote system 30 (personal computer 32) as a terminal, general-purpose programs such as a debugger and a profiler used on the conventional remote system (personal computer 32) can be used and therefore the software can be developed by effectively utilizing the resources.

The above-described example is an example of the development environment. As for an exemplary use on the user side, the case of preparing a program whereby the user communicates with the robot apparatus 1 via a personal computer or the like so as to observe the internal state of the robot apparatus 1 or to send a command to the robot apparatus 1 will now be described.

Usually, in order to realize such a function, it is necessary not only to prepare the program on the personal computer but also to add a code for transmitting emotion data to the personal computer 32, to a module (object) on the robot apparatus 1 which measures the emotion of the robot apparatus 1, and add a code for receiving data from the personal computer 32, to an object for executing reception of an operation command (object on the robot apparatus 1).

On the other hand, in the network system according to the present invention, each software module (object) is caused to operate on the basis of the framework of the inter-object communication as described above. If a gateway object for relaying network communication can be introduced, the inter-object communication between the objects of the personal computer 32 and the robot apparatus 1 is constructed simply by rewriting the connection file and connecting the emotion output and the operation command reception service of the existing robot apparatus 1 to the gateway object, and processing is carried out at each object.

Thus, a program can be newly developed on the personal computer 32 without changing the program embedded in the existing robot apparatus 1. For example, the user can communicate with the robot apparatus 1 via the personal computer 32 or the like so as to observe the internal state of the robot apparatus 1 (or output the processing state of the object to the outside), or to send a command to the robot apparatus 1. The user can also add a new function to the robot apparatus 1.

By thus constructing the network using the present invention, the following effects are achieved.

The development side of the program (software) for the robot system (robot apparatus) can develop a program on the highly convenient remote system.

Since the development is made possible by actually operating the robot apparatus 1 unlike a simulator or the like, the development side no longer needs to be troubled with the difference between the real environment and the simulator environment. That is, though it is difficult to set a simulator environment mimicking the real environment, the development side can develop a program without setting such a simulator environment.

Moreover, since the same source code is used as the source code of the target system (target board or robot apparatus) and as the source code of the remote system, the introduction work (transportation work) accompanying the system change is simplified and the occurrence of errors can be reduced.

In addition, simply by connecting the service of the inter-object communication to the gateway object, the function can be extended using the network without changing the existing robot program.

Since the fusion of the program on the robot apparatus and the program on the remote system is facilitated and the development of a program on the remote system is made possible, the processing which cannot be handled with the computer source on the robot apparatus 1 can be realized by the processing ability of the powerful remote system. Thus, it is possible to develop a more complicated program.

Figure 28:
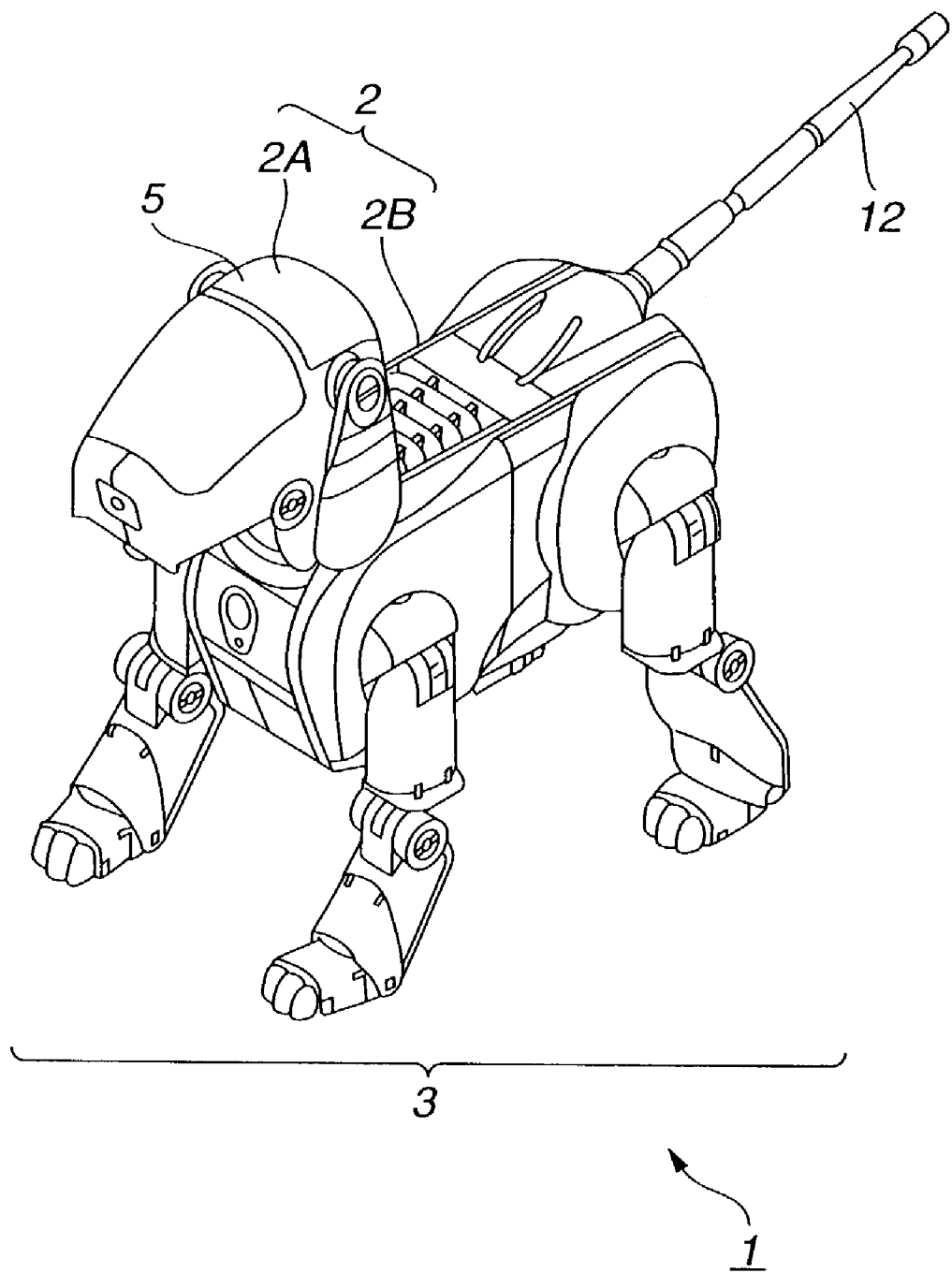
FIG. 28 is a view showing a more specific example of the robot apparatus.

Furthermore, the robot apparatus used as an embodiment of the present invention is not limited to a device having an appearance as shown in FIG. 1. For example, the robot apparatus 1 may also have an appearance/shape which is more like that of a certain animal, as shown in FIG. 28.

As is clear from the above description, the communication device according to the present invention comprises: first communication means having an information processing process for transmitting and receiving data to and from an information processing process of a first electronic equipment; and second communication means having an information processing process for transmitting and receiving data to and from an information processing process of a second electronic equipment. When the first communication means and the second communication means are connected with each other by radio or wired connection, inter-process communication is carried out between the information processing process for transmitting and receiving data of the first communication means and the information processing process for transmitting and receiving data of the second communication means, thus carrying out inter-process communication between the information processing process of the first electronic equipment and the information processing process of the second electronic equipment. Thus, since the inter-process communication between the information processing object of the first communication means and the object of the second communication means behaves like inter-process communication on the same system, the communication between the information processing process of the first electronic equipment and the information processing process of the second electronic equipment can be handled as inter-process communication on the same system.

The communication method according to the present invention comprises the steps of connecting first communication means having an information processing process for transmitting and receiving data to and from an information processing process of a first electronic equipment, with second communication means having an information processing process for transmitting and receiving data to and from an information processing process of a second electronic equipment, by radio or wired connection, and carrying out inter-process communication between the information processing process for transmitting and receiving data of the first communication means and the information processing process for transmitting and receiving data of the second communication means, thus carrying out inter-process communication between the information processing process of the first electronic equipment and the information processing process of the second electronic equipment. Thus, since the inter-process communication between the information processing object of the first communication means and the object of the second communication means behaves like inter-process communication on the same system, the communication between the information processing process of the first electronic equipment and the information processing process of the second electronic equipment can be handled as inter-process communication on the same system.

The information processing system according to the present invention comprises: an electronic equipment controlled by an information processing process; an information processing device in which an information processing process used for controlling the electronic equipment is taken and which handles the information processing process; and communication means for carrying out radio or wired communication between the electronic equipment and the information processing device. The information processing device carries out communication using the communication means between the information processing process of the electronic equipment when the electronic equipment is being operated and the information processing process taken therein, then uses data transmitted from the information processing process of the electronic equipment, and handles the information processing process taken therein. Thus, the information processing device can handle (for example, process) the information processing process which takes into consideration the electronic equipment existing in the real environment.

The program preparation method according to the present invention comprises: a program preparation step of carrying out radio or wired communication using communication means between an information processing process of an electronic equipment when the electronic equipment controlled by the information processing process is being operated and information processing process on an information processing device, and using data transmitted from the information processing process of the electronic equipment and preparing an information processing process used for the electronic equipment, at the information processing device; and a program embedding step of embedding the information processing process prepared at the program preparation step into the electronic equipment. Thus, the information processing device prepares the information processing process in consideration of the electronic equipment existing in the real environment. The electronic equipment has embedded therein such an information processing process prepared in consideration of the real environment, and operates on the basis of the information processing process. Since the information processing process is prepared in consideration of the real environment, the electronic equipment operates without having any trouble.

The invention claimed is:

1. A communication device comprising:
   first communication means having an information processing process for transmitting and receiving data to and from an information processing process of a first electronic equipment; and
   second communication means having an information processing process for transmitting and receiving data to and from an information processing process of a second electronic equipment;
   wherein when the first communication means and the second communication means are connected with each other by radio or wired connection, inter-process communication is carried out between the information processing process for transmitting and receiving data of the first communication means and the information processing process for transmitting and receiving data of the second communication means, thus carrying out inter-process communication between the information processing process of the first electronic equipment and the information processing process of the second electronic equipment; and
   wherein the information processing processes for transmitting and receiving data of the first and second communication means have a setting file in which the setting of a communication system is described, and carry out inter-process communication between the information processing process for transmitting and receiving data of the first communication means and the information processing process for transmitting and receiving data of the second communication means, on the basis of a description item of the setting file.

2. The communication device as claimed in claim 1, wherein thee information processing process is made up of a program prepared by an object-oriented system.

3. The communication device as claimed in claim 1, wherein the first electronic equipment is a robot apparatus with its operation controlled by the information processing process, and the second electronic equipment is an information processing device.

4. The communication device as claimed in claim 1, wherein protocol conversion to network communication is carried out in the inter-process communication between the information processing process for transmitting and receiving data of the first communication means and the information processing process for transmitting and receiving data of the second communication means, thus carrying out inter-process communication between the information processing process of the first electronic equipment and the information processing process of the second electronic equipment.

5. The communication device as claimed in claim 4, wherein conversion to TCP/IP (Transmission Control Protocol/Internet Protocol) is carried out by the protocol conversion to the network communication.

6. The communication device as claimed in claim 1, wherein a service name of inter-process communication between the information processing process of the first electronic equipment and the information processing process of the second electronic equipment is described in the setting file, and
   the information processing processes for transmitting and receiving data of the first and second communication means carry out inter-process communication between the information processing process for transmitting and receiving data of the first communication means and the information processing process for transmitting and receiving data of the second communication means, on the basis of the service name described in the setting file, thus carrying out inter-process communication corresponding to the service name between the information processing process of the first electronic equipment and the information processing process of the second electronic equipment.

7. The communication device as claimed in claim 1, wherein a corresponding item of connection between the information processing process for transmitting and receiving data of the first communication means and the information processing process for transmitting and receiving data of the second communication means is described in the setting file, and the information processing process for transmitting and receiving data of the first communication means and the information processing process for transmitting and receiving data of the second communication means are connected with each other so that inter-process communication is possible, on the basis of the corresponding item of the connection described in the setting file.

8. A communication method comprising the steps of connecting first communication means having an information processing process for transmitting and receiving data to and from an information processing process of a first electronic equipment, with second communication means having an information processing process for transmitting and receiving data to and from an information processing process of a second electronic equipment, by radio or wired connection, and carrying out inter-process communication between the information processing process for transmitting and receiving data of the first communication means and the information processing process for transmitting and receiving data of the second communication means, thus carrying out inter-process communication between the information processing process of the first electronic equipment and the information processing process of the second electronic equipment;

wherein the information processing processes for transmitting and receiving data of the first and second communication means have a setting file in which the setting of a communication system is described, and carry out inter-process communication between the information processing process for transmitting and receiving data of the first communication means and the information processing process for transmitting and receiving data of the second communication means, on the basis of a description item of the setting file.

9. An information processing system comprising:

an electronic equipment controlled by an information processing process;

an information processing device in which an information processing process used for controlling the electronic equipment is taken and which handles the information processing process; and communication means for carrying out radio or wired communication between the electronic equipment and the information processing device;

wherein the information processing device carries out communication using the communication means between the information processing process of the electronic equipment when the electronic equipment is being operated and the information processing process taken therein, then uses data transmitted from the information processing process of the electronic equipment, and handles the information processing process taken therein; and wherein the information processing processes for transmitting and receiving data of the first and second communication means have a setting file in which the setting of a communication system is described, and carry out inter-process communication between the information processing process for transmitting and receiving data of the first communication means and the information processing process for transmitting and receiving data of the second communication means, on the basis of a description item of the setting file.

10. The information processing system as claimed in claim 9, wherein the information processing process is made up of a program prepared by an object-oriented system.

11. The information processing system as claimed in claim 9, wherein the information processing device processes the information processing process, as the handling of the information processing process.

12. The information processing system as claimed in claim 9, wherein the information processing device outputs the processing state of the information processing process to the outside, as the handling of the information processing process.

13. The information processing system as claimed in claim 9, wherein the communication means comprises first communication means having an information processing process for transmitting and receiving data to and from the information processing process of the electronic equipment, and second communication means having an information processing process for transmitting and receiving data to and from the information processing process of the information processing device, and when the first communication means and the second communication means are connected with each other by radio or wired connection, inter-process communication is carried out between the information processing process for transmitting and receiving data of the first communication means and the information processing process for transmitting and receiving data of the second communication means, thus carrying out inter-process communication between the information processing process of the electronic equipment and the information processing process of the information processing device.

14. The information processing system as claimed in claim 13, wherein protocol conversion to network communication is carried out in the inter-process communication between the information processing process for transmitting and receiving data of the first communication means and the information processing process for transmitting and receiving data of the second communication means, thus carrying out inter-process communication between the information processing process of the electronic equipment and the information processing process of the information processing device.

15. The information processing system as claimed in claim 14, wherein conversion to TCP/IP (Transmission Control Protocol/Internet Protocol) is carried out by the protocol conversion to the network communication.

16. The information processing system as claimed in claim 9, wherein a service name of inter-process communication between the information processing process of the electronic equipment and the information processing process of the information processing device is described in the setting file, and the information processing processes for transmitting and receiving data of the first and second communication means carry out inter-process communication between the information processing process for transmitting and receiving data of the first communication means and the information processing process for transmitting and receiving data of the second communication means, on the basis of the service name described in the setting file, thus carrying out inter-process communication corresponding to the service name between the information processing process of the electronic equipment and the information processing process of the information processing device.

17. The information processing system as claimed in claim 9, wherein a corresponding item of connection between the information processing process for transmitting and receiving data of the first communication means and the information processing process for transmitting and receiving data of the second communication means is described in the setting file, and the information processing process for transmitting and receiving data of the first communication means and the information processing process for transmitting and receiving data of the second communication means are connected with each other so that inter-process communication is possible, on the basis of the corresponding item of the connection described in the setting file.

18. A program preparation method comprising:

a program preparation step of carrying out radio or wired communication using communication means between an information processing process of an electronic equipment when the electronic equipment controlled by the information processing process is being operated and information processing process on an information processing device, and using data transmitted from the information processing process of the electronic equipment and preparing an information processing process used for the electronic equipment, at the information processing device; and a program embedding step of embedding the information processing process prepared at the program preparation step into the electronic equipment;

wherein first communication means having an information processing process for transmitting and receiving data to and from the information processing process of the electronic equipment and second communication means having an information processing process for transmitting and receiving data to and from the information processing process of the information processing device are connected with each other by radio or wired connection, and inter-process communication is carried out between the information processing process for transmitting and receiving data of the first communication means and the information processing process for transmitting and receiving data of the second communication means, thus carrying out inter-process communication between the information processing process of the electronic equipment and the information processing process of the information processing device; and wherein the information processing processes for transmitting and receiving data of the first and second communication means have a setting file in which the setting of a communication system is described, and carry out inter-process communication between the information processing process for transmitting and receiving data of the first communication means and the information processing process for transmitting and receiving data of the second communication means, on the basis of a description item of the setting file.

19. The program preparation method as claimed in claim 18, wherein the information processing process is made up of a program prepared by an object-oriented system.

20. The program preparation method as claimed in claim 18, wherein protocol conversion to network communication is carried out in the inter-process communication between the information processing process for transmitting and receiving data of the first communication means and the information processing process for transmitting and receiving data of the second communication means, thus carrying out inter-process communication between the information processing process of the electronic equipment and the information processing process of the information processing device.

21. The program preparation method as claimed in claim 20, wherein conversion to TCP/IP (Transmission Control Protocol/Internet Protocol) is carried out by the protocol conversion to the network communication.

22. The program preparation method as claimed in claim 18, wherein a service name of inter-process communication between the information processing process of the electronic equipment and the information processing process of the information processing device is described in the setting file, and the information processing processes for transmitting and receiving data of the first and second communication means carry out inter-process communication between the information processing process for transmitting and receiving data of the first communication means and the information processing process for transmitting and receiving data of the second communication means, on the basis of the service name described in the setting file, thus carrying out inter-process communication corresponding to the service name between the information processing process of the electronic equipment and the information processing process of the information processing device.

23. The program preparation method as claimed in claim 18, wherein a corresponding item of connection between the information processing process for transmitting and receiving data of the first communication means and the information processing process for transmitting and receiving data of the second communication means is described in the setting file, and the information processing process for transmitting and receiving data of the first communication means and the information processing process for transmitting and receiving data of the second communication means are connected with each other so that inter-process communication is possible, on the basis of the corresponding item of the connection described in the setting file.

24. A network system in which a robot apparatus with an operation control program constructed by inter-object communication and a computer system constructed by inter-object communication carry out data communication via wired or radio communication, the network system comprising a gateway object for carrying out dynamic protocol conversion between the inter-object communication and network communication between the robot apparatus and the computer system, wherein the inter-object communication entails that a first communication object having an information processing process for transmitting and receiving data to and from the information processing process of the robot apparatus and second communication object having an information processing process for transmitting and receiving data to and from the information processing process of the computer system are connected; and wherein the information processing processes for transmitting and receiving data of the first and second communication objects have a setting file in which the setting of a communication system is described, and carry out inter-process communication between the information processing process for transmitting and receiving data of the first communication object and the information processing process for transmitting and receiving data of the second communication object, on the basis of a description item of the setting file.

25. The network system as claimed in claim 24, wherein the gateway object makes the correspondence between a service name of communication defined in the inter-object communication and an address and port number used in the network communication.

26. The network system as claimed in claim 24, wherein conversion to TCP/IP (Transmission Control Protocol/Internet Protocol) is carried out by the protocol conversion to the network communication.

27. A communication method in which a robot apparatus constructed by having inter-object communication and a computer system constructed by having inter-object communication carry out data communication via wired or radio communication,
the method comprising carrying out protocol conversion between the inter-object communication and network communication between the robot apparatus and the computer system,
wherein the inter-object communication entails that a first communication object having an information processing process for transmitting and receiving data to and from the information processing process of the robot apparatus and second communication object having an information processing process for transmitting and receiving data to and from the information processing process of the computer system are connected; and
wherein the information processing processes for transmitting and receiving data of the first and second communication objects have a setting file in which the setting of a communication system is described, and carry out inter-process communication between the information processing process for transmitting and receiving data of the first communication object and the information processing process for transmitting and receiving data of the second communication object, on the basis of a description item of the setting file.

28. The communication method as claimed in claim 27, wherein the protocol conversion is carried out by a gateway object, and the gateway object makes the correspondence between a service name of communication defined in the inter-object communication and an address and port number used in the network communication.

29. The communication method as claimed in claim 27, wherein conversion to TCP/IP (Transmission Control Protocol/Internet Protocol) is carried out by the protocol conversion to the network communication.

30. A robot apparatus which has an operation control program constructed by inter-object communication and which carries out data communication via wired or radio communication with a computer system constructed by inter-object communication,
the robot apparatus comprising a gateway object for carrying out dynamic protocol conversion between the inter-object communication and network communication with the computer system,
wherein the inter-object communication entails that a first communication object having an information processing process for transmitting and receiving data to and from the information processing process of the robot apparatus and second communication object having an information processing process for transmitting and receiving data to and from the information processing process of the computer system are connected; and
wherein the information processing processes for transmitting and receiving data of the first and second communication objects have a setting file in which the setting of a communication system is described, and carry out inter-process communication between the information processing process for transmitting and receiving data of the first communication object and the information processing process for transmitting and receiving data of the second communication object, on the basis of a description item of the setting file.

31. The robot apparatus as claimed in claim 30, wherein the gateway object makes the correspondence between a service name of communication defined in the inter-object communication and an address and port number used in the network communication.

32. The robot apparatus as claimed in claim 30, wherein conversion to TCP/IP (Transmission Control Protocol/Internet Protocol) is carried out by the protocol conversion to the network communication.

* * * * *